United States Patent [19]

Moran et al.

[11] Patent Number: 5,717,879
[45] Date of Patent: Feb. 10, 1998

[54] SYSTEM FOR THE CAPTURE AND REPLAY OF TEMPORAL DATA REPRESENTING COLLABORATIVE ACTIVITIES

[75] Inventors: Thomas P. Moran, Palo Alto; Scott L. Minneman, San Francisco; Steve R. Harrison, Portola Valley; Donald G. Kimber, Mountain View; William J. van Melle, Los Altos; Polle T. Zellweger, Palo Alto, all of Calif.; Gordon P. Kurtenbach, Toronto, Canada; Lynn D. Wilcox, Portola Valley, Calif.; Sara A. Bly, Hillsboro, Oreg.; William C. Janssen, Jr., Mountain View; L. Charles Hebel, Cupertino, both of Calif.

[73] Assignee: Xerox Corporation, Stamford, Conn.

[21] Appl. No.: 552,960

[22] Filed: Nov. 3, 1995

[51] Int. Cl.⁶ .......................................... G06F 3/00
[52] U.S. Cl. ........................ 395/339; 395/602; 395/331; 395/330
[58] Field of Search ....................... 395/328, 330, 395/331, 332, 971, 972, 339, 348

[56] References Cited

U.S. PATENT DOCUMENTS

| 5,307,456 | 4/1994 | MacKay | 395/154 |
|---|---|---|---|
| 5,317,732 | 5/1994 | Gerlach, Jr. et al. | 395/600 |
| 5,359,712 | 10/1994 | Cohen et al. | 395/161 |
| 5,388,197 | 2/1995 | Rayner | 395/154 |
| 5,404,316 | 4/1995 | Klingler et al. | 364/514 |
| 5,461,711 | 10/1995 | Wang et al. | 395/328 |
| 5,550,965 | 8/1996 | Gabbe et al. | 395/328 X |
| 5,574,845 | 11/1996 | Benson et al. | 395/348 X |

FOREIGN PATENT DOCUMENTS

495612A2  7/1992  European Pat. Off. ........ G06F 15/02

OTHER PUBLICATIONS

Pedersen, E.R., McCall, K., Moran, T.P., and Halasz, F.G., "Tivoli: An Electronic Whiteboard for Informal Workgroup Meetings," INTERCHI '93, Apr. 24-29, 1993, pp. 391-398.

Cruz, G. and Hill, R., "Capturing and Playing Multimedia Events with STREAMS", in Proceedings of ACM Multimedia '94, San Francisco, CA, Oct. 15-20, 1994, pp. 193-200.

Lamming, M.G., "Towards a Human Memory Prosthesis", Technical Report EPC-91-116, Copyright® Rank Xerox EuroPARC, Published in Proceedings of International Workshop Lecture Notes in Computer Science '91, Dagstuhl, Berlin, Jul. 1991.

Lamming, M.G., and Newman, W.M., "Activity-based Information Retrieval Technology in Support of Personal Memory," Technical Report EPC-91-103.1, Copyright® Rank Xerox EuroPARC 1991, pp. 1-16.

(List continued on next page.)

Primary Examiner—Raymond J. Bayerl
Assistant Examiner—A. Katbab
Attorney, Agent, or Firm—Richard B. Domingo

[57] ABSTRACT

A system for the capture and playback of temporal data representing a collaborative activity such as a meeting. Such temporal data is captured by one or more capture devices (e.g. audio recordings or an electronic whiteboard). Temporal data is comprised of timestreams and events. Timestreams are sets of timestamped data which represent some recordable aspect of the meeting. Events are contained within a timestream that represent natural activities that occurred during the course of the session. Events are used to create indices which provide direct access to a point or span in time during the collaborative activity. Playback of a session is performed under the control of a session access device. Coupled to the session access device are a plurality of players for playing back timestreams. The session access device utilizes event information to create a user interface for controlling session replay. The user interface is comprised of a plurality of windows. Each window may represent a player, a playback controller or an editor.

19 Claims, 22 Drawing Sheets

OTHER PUBLICATIONS

Rhyne, J.R., and Wolf, C.G., "Tools for Supporting the Collaborative Process," in *Proceedings of the ACM Symposium on User Interface Software and Technology,* Monterey, California, Nov. 15–18, 1992, pp. 161–170.

ScreenPlay User's Guide, Release 2.0, Copyright© 1991–1993, RAD Technologies, Inc., Palo Alto, California, pp. 1–4, 9, 12–14, 30–37, and 44–66.

Wolf, C.G., Rhyne, J.R., and Briggs, L.K., "Communication and Information Retrieval with a Pen–based Meeting Support Tool," *CSCW 92 Proceedings,* Nov. 1992, pp. 322–329.

SYSTEM FOR THE CAPTURE AND REPLAY OF TEMPORAL DATA REPRESENTING COLLABORATIVE ACTIVITIES

CROSS REFERENCE TO RELATED APPLICATIONS

The present invention is directly related to an invention that is the subject matter of a concurrently filed, commonly assigned U.S. patent application having the following serial numbers and titles:

Ser. No. 08/552,968, entitled "Computer Controlled Display System Using A Timeline To Control Playback Of Temporal Data Representing Collaborative Activities", herein incorporated by reference;

Ser. No. 08/552,648, entitled "Computer Controlled Display System Using A Graphical Replay Device To Control Playback of Temporal Data Representing Collaborative Activities", herein incorporated by reference;

Ser. No. 08/552,663, entitled "Computer Controlled Display System Actvities Using Correlated Graphical and Timeline Interfaces For Controlling Replay Of Temporal Data Representing Collaborative Activities", herein incorporated by reference.

FIELD OF THE INVENTION

The present invention is related to the field of systems for multi-media capture, replay and editing of sessions.

BACKGROUND OF THE INVENTION

Much of the work of groups, even in such orderly settings as structured meetings, takes the form of casual interaction the give and take of conversational exchanges whereby a group comes to a shared understanding of the technical, process, and relational facets of their work. This casual activity is poorly supported by most computational tools, which tend to focus on the outcomes of such activity, while ignoring much of how the group arrived at those outcomes. Further, attempts to gather such information typically end up formalizing the activity, making the participants conform to a way of working that suits the information gathering tool rather than supporting their natural work practices.

Collecting audio, video, and computational recording of a meeting provides a rich, reviewable record of group processes. Unfortunately, the benefits of such a record has tended to be unwieldy, oftentimes because of the required sequential access. With the advent of digital recordings of such information the ability to instantly access such information is possible. However, instant access is only useful if you know where to go. Thus, it is necessary and desirable to index such records based on meaningful elements or events.

One approach to indexing is termed Real-Time notetaking, where a person takes notes during the meeting using a system that timestamps the various individual elements of the notes. This provides a comprehensible index into the recording of the meeting. By simply selecting any element of the notes, the system can retrieve and play the part of the AV recording that corresponds to the timestamp of the note element.

The simplest example is a textual transcription system, in which the user simply types text as the meeting proceeds (the text can be a literal transcription of what is being said or arbitrary notes about the meeting). The notes consist of a string of text, and the timestamped note elements are the individual characters of the text. After the notetaking is complete, the user can select a character and the corresponding part of the meeting recording will be retrieved and played.

Notetaking systems allow users to construct a visual representation (i.e. the notes), whose visible elements function as indices into the meeting recording. Each index element has a time associated with it, which is the time at which the user created it. Since each index element is visible, the user can select it by simply pointing to it and, since it has an associated time, obtaining an address into the meeting recording.

Notetaking systems work fine as long as the construction of the visual representation only consists of a sequence of element creating events. Problems arise when the representation is allowed to be edited during the course of the meeting, i.e. there are also element-altering and element-deleting events. The source of the problems is that the indices are the visible elements and not the events.

A downside of the notetaking approach is that a person must be devoted to the notetaking task. Thus, it would be desirable to create an index into the meeting recording without dedicating a person to the task of notetaking, and which is a by-product of the natural meeting activity itself.

Related works include:

Pedersen, E., K. McCall, T. Moran, and F. Halasz, "Tivoli: An Electronic Whiteboard for Informal Workgroup Meetings", *Proceedings of the INTERCHI '93 Conference on Human Factors in Computing Systems*, pp. 391–389, April 1993 which describes an electronic whiteboard application called Tivoli. The paper describes the operation of Tivoli and the motivations for its design. Several design issues are discussed including the need to reconsider the basic assumptions behind the standard desktop Graphical User Interface, the use of strokes as the fundamental object in the system, the generalized wipe interface technique, the use of meta-strokes as gestural commands.

Wolf, C., J. Ryne, and L. Briggs, "Communications and Information Retrieval with a Pen-based Meeting Support Tool", *Proceedings of the Conference on Computer-Supported Cooperative Work*, pp. 322–329, November 1992 which describes a system called We-Met (Window Environment-Meeting Enhancement Tools) for supporting communication and information retrieval needs of small group meetings. We-Met runs on workstations with an attached LCD/digitizing tablet over a local area network. We-Met provides a shared drawing area in which the participants may each work in. The shared drawing area is presented on the workstations. The reference describes the results of a user study of We-Met in group settings to better understand how it is used and a study that did not involve We-Met conducted for the purpose of better understanding how it can be used to facilitate information retrieval of recorded meeting content.

EPO Publication 0 495 612 A2 entitled "A Data Access System", Michael G. Lamming, published Jul. 22, 1992 describes a note-taking system based on a notepad computer with an integrated audio/video recorder. As the user types on the keyboard or writes with the stylus or similar input instrument on the notepad computer, each character or stroke that is input by the user is invisibly time-stamped by the computer. This activity, results in the creation of meeting "notes". The audio/video stream is also continuously time-stamped during recording. When playback is desired, the meeting notes as finally created are presented to the user. To play a section of recording back, the user selects part of the note (perhaps by circling it with a stylus) and invokes a "playback selection" command. The computer then examines the time-stamp and "winds" the record to the corresponding place in the audio/video recording, where it starts playing—so that the user hears and/or sees what was being recorded at the instant the selected text or strokes were input. With a graphical user interface, the user may input key "topic" words and subsequently place check marks by the appropriate word as the conversation topic veers into that neighborhood.

SUMMARY

The present invention is directed to a system for the capture and playback of temporal data representing a collaborative activity such as a meeting. Such temporal data is captured by one or more capture devices (e.g. audio recordings or an electronic whiteboard). A plurality of capture devices are used to record a collaborative activity. Temporal data is comprised of timestreams and events. Timestreams are sets of timestamped data which represent some recordable aspect of the meeting. Audio and video recordings, or a stored history of the actions on an electronic whiteboard are examples of timestreams. Events are occurrences within a timestream. For example, an event may be a particularly significant action taken on the electronic whiteboard, or a change in speaker during the session. Events are used to create indices which provide direct access to a point or span in time during the collaborative activity. Timestreams may inherently define events, or alternatively,timestreams may be analyzed to identify events. Event information is comprised of a timestamp, an event type and a list of various properties of the instance of the event.

Playback of the temporal data is desirable to recall conversations and/or other activities that occurred during the meeting by both those present and by those who did not attend the collaborative activity. The timestreams of a session are played back contemporaneously. Such contemporaneous playback is desirable since it best conveys the dynamics of the meeting.

Playback of a session is performed under the control of a session access device, typically a computer controlled display system. Coupled to the session access device are a plurality of players for playing back timestreams. The session access device utilizes event information to create a user interface for controlling session replay. The user interface is comprised of a plurality of windows. Each window may represent a player, a playback controller or an editor (which would permit a user to create additional timestream information).

DETAILED DESCRIPTION OF THE PREFERRED EMBODIMENT

Figure 1:
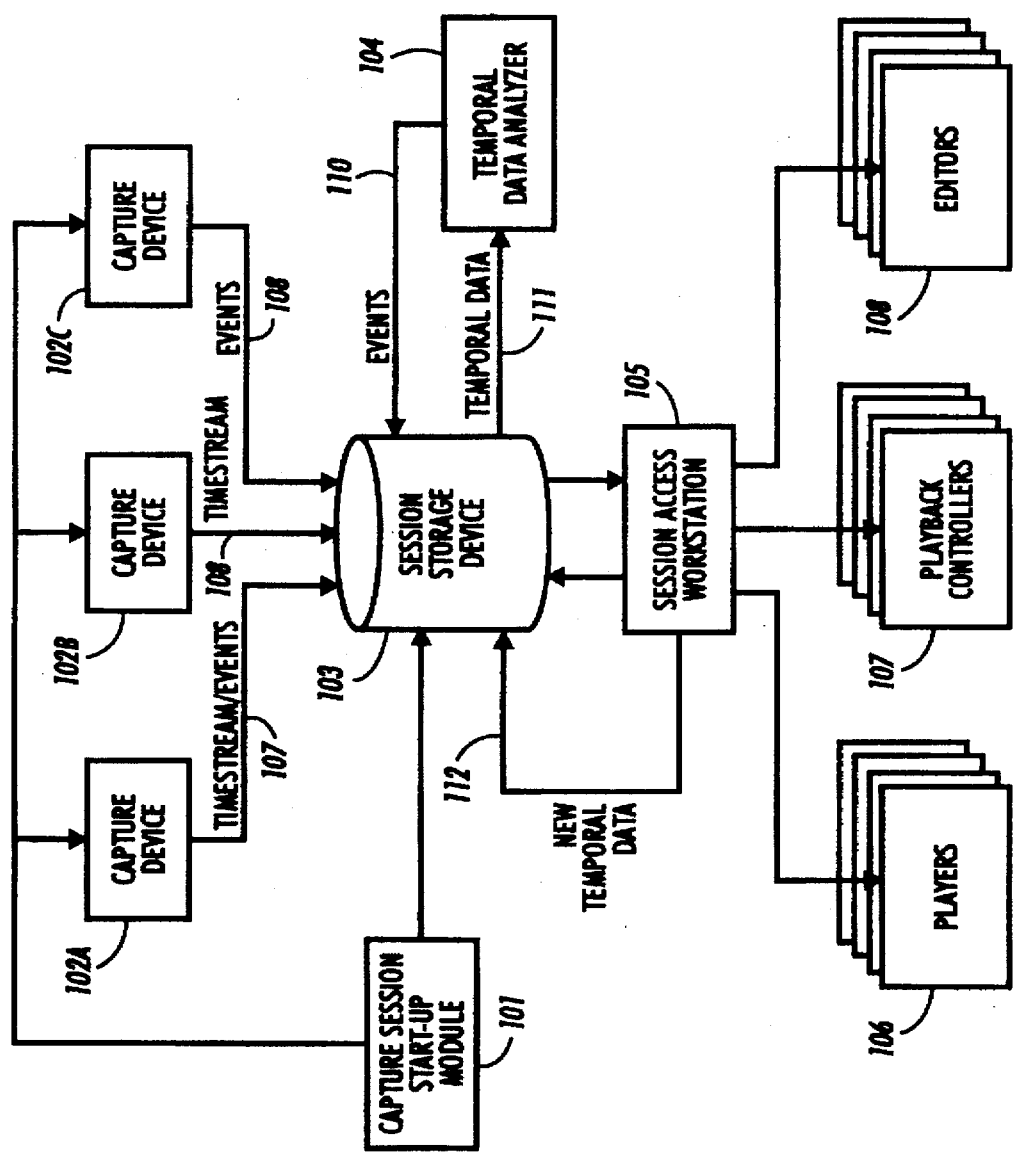
FIG. 1 is a block diagram of a system for capture and replay of temporal data in the currently preferred embodiment of the present invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention provides for the replay of records of collaborative activities, such as meetings, and other non-collaborative activities. While the currently preferred embodiment is naturally described in the setting of a meeting, the present invention is not limited to such activities. Non-collaborative activities include presentations, speeches, training sessions, and the like. Meetings amongst groups of people are held for various reasons (e.g. brainstorming, project review, etc.). Often, a participant, or some other designated person will take "minutes" of the meeting to report the "output" or results of the meeting. The creation of such minutes will typically require that written notes be maintained. However, such written notes of the meeting themselves may be incomplete, or may interfere with the meeting itself. Other meeting artifacts (e.g. diagrams or lists) are also created through use of some shared representation medium, e.g. a whiteboard. In any event, it is often desirable to go back and look at such notes and/or artifacts to prepare the minutes.

Another aid in creating meetings minutes is an audio or video recording. Unfortunately, such recordings are purely sequential and often very difficult to efficiently retrieve information from.

An object of the present invention is to create indices into the meeting recording of a collaborative activity that are a natural by-product of the activity itself. This provides an intuitive way for people to gain direct access to portions of the recorded session. Events such as the change of a speaker, writing on and manipulating markings on a whiteboard or the taking of a note are examples of such natural by-products of a meeting that provide useful index points.

A use of the present invention is to permit a person, either an attendee or a non-attendee of the activity, to replay the activity, and add their own written or verbal comments. These comments are created in the form of new events having a temporal frame of reference identical to that of the original activity.

The present invention may be used to support collaborative activities having different formats. One such format is where a prepared agenda is presented and the collaborative activity addresses the points on the agenda. The present invention may support such a format by enabling the agenda to be "saved" in a digital form, displaying the agenda during the course of the activity and enabling annotations to be made on the displayed agenda. Such annotations may subsequently be used as indices to the record of the activity (e.g. if someone wanted to hear the discussion about a particular agenda item discussed during the activity). Another format is brainstorming. Here, a general topic is discussed and through the synergy of the group, ideas are generated. These ideas are typically written onto a shared medium like a whiteboard for discussion. Later, a user may view a "re-creation" of the writings on the whiteboard and use the markings to go directly to points of interest.

The currently preferred embodiment of the present invention is implemented on a computer controlled display system having a Graphical User Interface (GUI) which allows multiple concurrent "windows" to be displayed. A "window" refers to a visual representation of an executing task. As will be described in greater detail below, a window may be programmed to function as one or more of a player, playback controller, or an editor. Windows and operation thereof is well known in the art, so no further discussion of windows or their operation is deemed necessary. Such a GUI will also support operations such as "point and click" and "drag and drop". A "point and click" operation is one where a cursor on a display screen is positioned over a desired portion of the display, such as an icon, using a cursor control device such as a mouse or trackball. Once the cursor is appropriately positioned, a button/switch associated with the cursor control device is quickly depressed and released. This creates a signal which causes a predetermined and context dependent operation to occur. Other operations may require a "double click" where the button/switch is depressed and released rapidly, twice in succession. A "drag and drop" operation is one where the cursor is positioned on an object, the button associated with cursor control device held down, and the object moved or stretched until the button is released (or the movement exceeds some predetermined boundary).

The system of the present invention is described with reference to a software based timestream architecture and to a systems architecture. The timestream architecture describes the software framework in which the currently preferred embodiment is implemented. The system architecture describes the functional components of the present invention.

Terms used in the description of the timestream and system architecture are now defined.

Timestream refers to timestamped media data captured on a capture device and which can be played back on a player.

Events are data representing an occurrence, e.g. a switch in speakers or writing on a whiteboard, that happen at some point or interval during an activity being captured.

Temporal Data refers to the combination of Timestreams and Events.

Sessions are named collections of Temporal Data, which represent coherently captured activities such as meetings.

Players are devices which can playback a timestream in its original form or in a form which is indicative of the dynamics of the timestream.

Editors refer to user interfaces through which changes may be made to visual indicators or by which Events and timestreams may be added to a session.

Playback Controllers refer to user interfaces through which playback of a session is controlled.

Capture Devices are devices which capture and store temporal data. Different types of capture devices will capture different media (e.g. audio, video or writing on a whiteboard) of a session.

Timestream Architecture

The timestream architecture supports the use of extensible sets of tools for coordinated recording and playback. It is based on a distributed object system that allows users to easily build object which exist in one address space on a particular machine but have "proxy" objects that exist in the same or different address spaces on the same or other machines in a network is utilized. This distributed objects system is termed Inter-Language Unification (ILU) and is described by Janssen in "ILU Manual", Xerox Technical Report, ISTL-CSA-94-01-02, January 1994. The basic data components of the timestream architecture are Events, Timestreams and Sessions.

Events consist of a start time, a duration (possibly zero for 'point' events), a type, and possible properties which may depend upon the type. (For example a LiveBoard page event might have 'page-number' and 'page-heading' properties.) The interface to Event objects looks like this TYPE Event=CLASS
SUPERCLASS PersistentObject END

METHODS getType( ): String,
getStartTime( ): Time,
getDuration( ): Time

END

The interface specifications described herein are in the style of the specification language of ILU system described above, but are not intended to be literal or exact, and should be easily interpretable by one familiar with object oriented programming. The meaning of datatypes String and Time are taken as self evident. Additionally, as a subclass of PersistentObject, Events inherit the methods getPropertyNames( ): StringSequence
    setProperty(name: String, value: String)
    getProperty(name: String): String, Events are created by calls to Session objects as described below.

Timestream objects are used to reference stored data for a given media type. Generally speaking the data associated with a timestream allow time based access of the recorded media. Although for many digital media, such as recorded audio, this consists of time sampled data which could be treated as events, the high volume and highly media (and even device) dependent interpretation of the sampled data make it more practical to view the timestream as 'opaque'. That is, timestream data is normally manipulated only by special tools related to the media and format of the timestream. In particular, the data is created by a Recorder object and played back by a Player object. Also, it may possibly be analyzed by media specific tools to produce Events. (e.g. speaker segments, silence/pause, scene change, etc.) Note also, that treating a timestream object as opaque allows the architecture to accommodate analog media. (e.g. the recorder and player might be a VCR under computer software control, and the timestream might provide the software with information about which tape should be used, and an absolute time that should be associated with the beginning of the tape.) The interface to Timestream objects looks as follows:

```
TYPE Timestream = CLASS
    SUPERCLASS PersistentObject END
    METHODS
    mediaType( ): String,      e.g. audio
    format( ): String,         e.g. sun au
    startTime( ): Time,
    duration( ): Time,
    END
```

Sessions are hierarchical collections which may contain events, timestreams and other sessions. This use of the term 'Session' is broader than one sometimes encounters, and it should be noted that a 'Session' in the narrower sense of data associated with say a given meeting or discussion, would be a special case. Sessions are essentially a general purpose bookkeeping mechanism for organizing Timestream data. The interface to Session objects looks something like this

```
TYPE Session = CLASS
    SUPERCLASS PersistentObject END
    METHODS
    getTimestreamByName(name: String): Timestream,
    getAllTimestreams( ): Timestream Sequence,
    getSessionByName(name: Session): Session,
    getAllSessions( ): Session Sequence,
    createEvent(start: Time, dur: Time, type: String, props:
                PropertyList): Event
    END
```

Players, Recorders and Media servers

The timestreams architecture is extensible in the sense that Player and Recorder objects share a common interface independent of media type, and that no fixed set of supported media types is assumed. A simplified interface to Player and Recorder objects is:

```
TYPE Player = CLASS
    METHODS
    seek(t: Time),         Change playback time to t
    location( ): Time,     Return current playback time
    play(s: Speed),        Play with speed factor s (1 = normal)
    stop( ),               Stop playing
    . . .
    attach(timestream: Timestream) Set player to play given
                                                  timestream
    END;
TYPE Recorder = CLASS
    METHODS
    record( ),
    pause( ),
    createRecording(session: Session, name: Name): Timestream,
    finishRecording( ),
    END;
```

Player and Recorder objects for a given media type are implemented by a 'MediaServer' associated with that media type. Of course supporting a new media type requires the implementation of a new MediaServer, but no change to the architecture (i.e. to the interfaces necessary for creating or controlling recorders and players) are required. This means that generic applications (e.g. recording control programs or access and playback control programs) can be written which will automatically support new media types, or new implementations of service for existing media types. A simplified description of the interface to MediaServer objects is given by TYPE MediaServer=CLASS

METHODS getRecorder(format: String, context: String): Recorder,
    getPlayer(format: String, context: String): Player

END

The context argument specifies information about the Player or Recorder. For example, it could specify the host and device name used for audio input/output.

Analyzers can be used to process the data associated with one or more timestreams and produce events. Two such analyzers used in the currently preferred embodiment are described below. A simplified description of the interface to an analyzer is given by TYPE Analyzer=CLASS

METHODS produceEvents(session: Session, specs: String)

END

The analyzer accesses the data in timestreams of the given session, and creates events associated with the session. Which types of timestream (e.g. audio, video, etc.) are accessed by the analyzer depend on the type of analyzer. The 'specs' argument provides any necessary information about how the analysis is to be performed. For example the analyzer might be an audio word spotter which creates an event every time a given word (which would be part of the specs string) is spoken. Note that the Analyzer could be running after a session has been recorded, or in real time during the recording process. In real time, the events produced by the analyzer, can be 'observed' by other processes (see event notification described below) such as a process that implements a user interface.

To further facilitate this extensibility, the architecture provides a broker object which locates MediaServers appropriate for supporting media of a specified type. The broker can also help locate other kinds of objects such as analyzers. The brokers can use information stored in shared network files to keep track of which running processes implement a given object type (e.g. an audio MediaServer), and/or of which programs must be run to create those processes. Other network based name services could also be used. A simplified description of the interface to a broker is given by TYPE Broker=CLASS

METHODS getMediaServer(media :String): MediaServer
getAnalyzer(type: String): Analyzer

END

Basic control

Events, timestream and session data are stored in a timestream database. Application programs using the timestream database first obtain a timestream master object, which has methods for creating or locating other objects. The master object may be obtained from a timestream server running in another process (perhaps on another host) through the same mechanisms as used by Brokers described above. Alternatively, the program code which implements the Timestreams server (and the master object) may be included directly in an application process.

The basic steps necessary for a simple recording application in pseudo code are:

```
... get top level timestream object called 'master' ...
session = master.getSessionByName('Recordings')
broker = master.getBroker( )
mserver = broker.getMediaServer('audio')
recorder = mserver.getRecorder('mu law', 'default audio device')
recorder.createRecording(session, 'recording1')
recorder.record( )
    ... some code which looks for user interface events indicating that
    recording should be pauses, resumed, or completed.
    ... call routine to close recording
recording.finishRecording( )
exit
```

The above pseudo-code fragment describes the steps needed to create an audio recording named 'recording1' in an existing session called Recordings.

The pseudo-code necessary for playing back the recording would be

```
... get top level timestream object called 'master'
session = master.getSessionByName('Recordings')
timestream = session.getTimestreamByName('recording1')
broker = master.getBroker( )
mserver = broker.getMediaServer('audio')
player = mserver.getPlayer('mu law', 'default audio device')
player.play(1)
    ... wait for user interface events indicating playback should be stopped,
or that a seek to a different time should be called.
```

Confederations—Coordinated Playing and Recording

The timestreams architecture provides several mechanisms which help applications coordinate with one another in general, and which help coordinate control of multiple players and recorders in particular. One mechanism is the Confederation object which is a collection of Players and/or Recorders which act as a single Player and/or Recorder. Players or Recorders may be dynamically added to or removed from a confederation. A simplified description of the interface to a Confederation is given by

```
TYPE Confederation = CLASS
    SUPERCLASSES Player, Recorder END
    METHODS
        registerPlayer(player: Player),
        unregisterPlayer(player: Player),
        registerRecorder(recorder: Recorder),
        unregisterRecorder(recorder: Recorder);
        ...
    END
```

As a subclass of Player and Recorder, it is implied that a Confederation supports the methods of those classes such as Play and Record. The Confederation also supports additional methods implementing such behaviors as the playing of sequences of time ranges.

Using confederations, simplified code for setting up and controlling playback of all media recorded for a session called 'ProjectMeeting#3' would look like

```
top level timestream object called 'master'
    ... session = master.getSessionByName('ProjectMeeting#3')
    ... broker = master.getBroker( )
    ... conf = master.getConfederation('xyz')
    ... timestreams = session.getAllStreams( ) for each timestream in
timestreams do
        begin
            ... mserver = broker.getMediaServer(timestream.mediaType( ))
            ... player = mserver.getPlayer(timestream.format( ), 'host1')
            ... conf.registerPlayer(player)
        end
    conf.play( ) ...
    ...
    wait for user interface events indicating how playback should be
controlled.
```

Note that the confederation is given the name 'xyz'. Other programs could get this confederation from the master object and use it to control playback. This allows several programs running on the same host, but perhaps with very different interfaces to jointly control playback. Furthermore the same program as described above, but running on a different host could create players associated with that host, and register them with the 'xyz' configuration. The result would be a shared distributed playback tool, requiring essentially no additional programming burden to implement.

Event Notification—Interclient communication

Another coordination mechanism is event notification. A program can implement an EventNotifier, which is an object having a method called 'noticeEvent'. The notifier may be registered with a session object, and then whenever an event is added to that session, the noticeEvent method is called with the event as an argument. For example when a selection is made of some objects in on a LiveBoard Window, events can be created indicating times associated with the selected objects, and a timeline interface with a registered EventNotifier can be contacted (i.e. the noticeEvent method called) allowing it to graphically indicate those times. This example is described in greater detail below.

Synchronization

Synchronization issues arise at a variety of junctures and in numerous forms. First, during capture, there is the need to keep timestreams sufficiently aligned so that errors will not be perceptually annoying during playback. In the case of audio and video, this means that video and sounds must stay aligned to approximately 1/30 second (before annoying lip-sync problems arise, for instance). Since the two timestreams may be captured independently, on different machines, it is necessary to use (or reconstruct) some common clock among the various sources. In the currently preferred embodiment, when running fully connected, the Network Time Protocol (NTP) described in RFC-1769 is used among the distributed machines to keep the clocks accurate to within milliseconds (this is an adaptive protocol and will usually yield even better results by learning how to adapt to the machine's drift, not simply by resynchronizing to a common standard). Preferably, each quanta of a timestream's data would be timestamped (as with the Real-Time Protocol packets used in the video), but system assurances that the data will be sampled at a precise clock rate is also adequate.

In other cases, e.g., textual annotations indexing other media timestreams, requirements for such strict synchronization may be relaxed. Again, the metric of needing sufficient accuracy that any errors will not be annoying during playback is applied. For a textual note, this means that the note must index the timestream at a location sufficiently close to that which the user intended so that the mark is a functional pointer to the recorded material. In some circumstances, seconds of slop may be allowable, in others, fractions of a second may be intolerable. If the user is running NTP on the hardware that's running the annotation software, that measure will generally provide sufficient accuracy. Other options include making a call a time server to get the current time from an NTP-equipped machine whenever an annotation is made, or synching the clocks at the outset of the meeting to calculate an offset between the annotation machine and NTP time. This last form of correction may take the form of a special "synchronization event"—one that is noted in (or can be analyzed out of) the data of two or more of the distributed resources.

Almost regardless of the degree of precise synchronization required, provisions can be made that will permit fully disconnected operation of various capture devices. This is desirable in cases where a recording is made in a setting where connection (computational, audio, video, etc.) is undesirable or impossible. Handheld computers or commercial camcorders are acceptable capture devices, provided that means are provided for eventually aligning the disparate clocks of the equipment. An example of a technique to align a disconnected laptop with an audio recording is to hit a laptop key noisily; this is an effective synchronizing event. The keystroke is picked up by the laptop and timestamped by its clock; the audio is analyzed to find the audio event representing the key hit, this event being timestamped with the audio recorder's clock. From this the offset between the two clocks can be computed, and one of the sets of timestamps adjusted to the other.

Drift (very low frequency errors) is also an issue during recording sessions. Depending on the degree of accuracy needed in sessions where independent clocks are employed, it may be necessary to take readings at the start and end of the session to compensate for systematic gains or losses or check the clock repeatedly for offset corrections. Drift in those elements of the system that are docking themselves (e.g., an audio device running at a reported 8000 samples/sec that turns out to be 8057 samples/sec) may require additional tweaking during playback, if data can be gathered to suggest corrective action (e.g., play at 8057/8000 when normal speed playback is desired).

Jitter (higher frequency errors) are generally handled by buffering at appropriate places in the system.

Synchronization issues in timestreams playback sessions (which often coincide with capture sessions, or may be sort of "nested" in a capture setting) are closer to those typically dealt with in multimedia systems.

To set context it is assumed that a variety of media timestreams (audio, video, computing logs) have been captured and are now charged with playing back all or a desired subset of those timestreams in close synchrony so that a captured activity may be re-experienced. It is further assumed that all of the records were captured with perfect data, no drift, jitter, or offsets to compensate for.

In the currently preferred embodiment the various timestream players operate in a free-wheeling mode, using well-synchronized and drift-free system clocks to stay reasonably closely synchronized. This means that each player is responsible for playing its timestream in a manner that matches the passage of system time. In normal playback speed, this means that exactly one second of playback (and system time passage) should occur for each second of the original disk recording; faster and slower playback rates simply represent more and less of the recording being played back. Note that the best representation of these higher and lower speed playbacks may be customized for a user's needs—high-speed, pitch-preserved speech may be desired for skimming a meeting, or quarter-second video clips chained together from appropriate intervals might best convey very-high speed video playback.

Two aspects of using free-wheeling synchronization are worthy of note—good startup and pause opportunity. The first is simply that correct behavior of such an approach is dependent upon the players all starting at the same time, regardless of transmission time, buffering, etc. This means that the players should honor the request for a scheduled start (e.g., initiate playback at X system time (some small but adequate time (fractions of seconds) into the future) at 100% normal speed of material recorded at Y system time). This mode of startup assures a coordinated start where subsequent real-time clock adherence will produce the desired behavior. Pause opportunity simply means that particular user actions give the players an additional opportunity for minute synchronization corrections (e.g., declaring one player to be the master and having all child players sync to it whenever the user stops or pauses the playback).

System Architecture

A block diagram view of the hardware architecture of the present invention is illustrated with reference to FIG. 1. Referring to FIG. 1, a session start-up module 101 performs various "housekeeping" functions in preparation for recording a session. The session start-up module is preferably embodied as software executing on a computer based system that is coupled to the various recording components. Among its tasks, the Session start-up module must make sure that session storage device 103 has enough available storage capacity for storing the temporal data that is to be created. This is accomplished by providing an estimate as to the length of the session to be recorded and the number/types of capture devices being used. The capture session start-up module 101 will also synchronize the start of "recording" by each of the capture devices 102a–c. Each of the capture devices may commence recording at the same or at different times.

The capture devices 102a–c capture the timestreams of the various media and in some instances create events. The capture device 102a generates timestream and event data 107. In the currently preferred embodiment, an example of capture device 102a is an electronic whiteboard such as the commercially available LiveBoard TM product available from LiveWorks TM, a Xerox Company, of San Jose, Calif. The timestream data being captured from the LiveBoard is generated asynchronously as interactions occur. An event may also be generated by invocation of a predetermined function (e.g. changing a page on the LiveBoard.)

The capture device 102b generates a timestream 108. In such a type of capture device, the capture device is continually in a mode of capturing timestream data. Typical examples of capture device 102b are video and audio recorders. Another example of such a capture device 102b is a pointer. A pointer capture device is one that captures the movement of a pointer, e.g. laser pointers that are typically used during a presentation to point out something on a projected slide or other visual. A pointer capture device is particularly useful for formal presentations when the commonly viewed material is prepared beforehand. The replay of a pointer timestream would thus show the movements of the pointer during the replay of a presentation.

The capture device 102c only generates events 109. An example of the capture device 102c is a button. A button is a device which causes the creation of an event in a button timestream associated with a user operating the button. Button events may be created by the user to indicate various activities such as the beginning of a topic of interest, a particularly useful dialog or the switching of a topic. Another example is a slide projector. Events in a slide projector timestream would indicate the changing of slides.

The capture devices 102a–b preferably capture the timestream in a digital format. It is desirable to store the timestream in a digital format to facilitate direct and random access to the various parts of the timestream. However, it is within the scope of the present invention to capture and store timestream data in an analog format. The format of a timestream will correspond to the capture device used to create the timestream. For example, an audio timestream is comprised of a set of audio samples taken at some regular interval, while a LiveBoard timestream is a history file of timestamped primitive operations (described in more detail below). Management of the captured timestream data is performed by various Media Servers which can choose to store their data in whatever way they deem most appropriate.

The created temporal data is stored in session storage device 103. The session storage device 103 provides permanent storage for different types of data: session data, event data, and timestream data. The session storage device 103 is, in practice, distributed over different physical storage devices and managed by different components of the Timestream Architecture (described below).

Also coupled to the session storage device 103 is a temporal data analyzer 104. The temporal data analyzer 104 is a processing means (e.g. a computer based system) that is used to analyze temporal data 111 to identify events 110. The event information is also stored in the session storage device 103.

Access to a recorded session is accomplished through a session access workstation 105. This access may be over a network (e.g. in a client-server architecture), or it could be through a direct connection. Access session start-up module 109 performs the various "housekeeping" functions necessary for replaying a session. The functionality of the access session start-up module is typically performed by the session access workstation 105. The session access workstation 105 is typically a computer controlled display system wherein control of session playback is accomplished through a graphical user interface presented on a display. Such a graphical user interface is described below. In the currently preferred embodiment, the session access workstation is a SUN SparcStation-10 running the Sun OS 4.1 operating system with an X-Windows graphical user interface, available from SUN Microsystems Inc., of Mountain View, Calif.

Further coupled to the session access workstation 105 are players 106, playback controllers 107 and editors 108. Each of the various players, playback controllers, and editors is integrated within the session access workstation. So playback of an electronic whiteboard timestream is accomplished through a first window on the display of the workstation, a video timestream through a second window on the display of the workstation and an audio timestream via an audio subsystem of the workstation. However, it would be apparent to one of skill in the art that the players need not be integrated within a session access workstation, and may be discrete playback devices. Further, in the currently preferred embodiment, a single window may perform the function of a player, playback controller and editor. The organization of windows and their accompanying functionality in the currently preferred embodiment is described in greater detail below with reference to FIG. 3.

Finally, new temporal data 112 created through use of an editor is stored in session storage device 103.

LiveBoard Operation

The primary function of the LiveBoard in a collaborative activity is to provide a "shared representation" which each user can view and interact with. It should be noted that the LiveBoard and its operating software are designed so that such a "shared representation" need not be on a single LiveBoard device. Multiple LiveBoards can be coupled together via networks such that the actual collaborative activity may take place at different physical locations.

The LiveBoard as used in the currently preferred embodiment is not primarily intended to be a means for creating indices to the session recording. However, as will be discussed in greater detail below, the LiveBoard has unique capabilities which make it a useful tool for controlling subsequent playback of a recorded session. The LiveBoard operates under the control of the Tivoli application. The Tivoli application is described in detail by Pedersen, E., K. McCall, T. Moran, and F. Halasz in "Tivoli: An Electronic Whiteboard for Informal Workgroup Meetings", *Proceedings of the INTERCHI '93 Conference on Human Factors in Computing Systems*, pp. 391–389, April 1993. It should be noted that a version of the Tivoli application is commercially available from LiveWorks under the name Meeting Desk, for operation on a personal computer class system.

Tivoli has a user interface that is similar to the class of image creation programs known as "draw" programs. An example of a draw program is MacDraw available from Claris Corporation of Santa Clara, Calif. Draw programs create and manipulate images as collections of graphical objects. Tivoli drawings are represented as graphical objects. Graphical objects include:

strokes: "digital ink" objects created with a pen input device characters: created via keyboard or imported from text files images/icon objects: created by import or copying structured objects: imported from databases clocks: created with a clock gesture. Clocks are special marks created on the LiveBoard that appear as a circular analog clock face showing its creation time.

Tivoli maintains a history list of executed primitive operations, e.g. add an object, delete an object, create an object, change an object, select an object(s) or change a page. Every primitive operation in the history list is timestamped and is associated with an object. As will be described in greater detail below, it is this history list that is analyzed to identify events.

The graphical objects appearing on the LiveBoard may be either made during the course of a meeting or loaded from some memory media (e.g. a floppy disk) in a fashion similar to opening a word-processing file on a personal computer.

This latter instance is particularly useful when the session is a formal presentation.

Another important aspect of the operation of the LiveBoard is the use of gestures. A gesture is an interaction with a LiveBoard that is created like any other "inkstroke", but is interpreted as a command (e.g. editing commands). For example, if a particular object is to be "deleted", the objects are selected by an encircling gesture with the pen and a delete command (e.g. a pigtail gesture) invoked. After the deletion occurs, the marking caused by the gesture no longer appears on the LiveBoard (however, as will be described later, in the present invention a "ghost" image may be retained when the session is replayed).

Further aspects of the Tivoli user interface are illustrated below with respect to the LiveBoard Window.

Session Storage Device

As described above, the Session Storage Device is the functional component of the Timestream Architecture that provides permanent storage for different types of data: Session data, Event data, and Timestream data. The Session Storage Device is, in practice, distributed over different physical storage devices and managed by different components of the Timestream Architecture. It is most practical to divide up the Session Storage Device into a Timestream Database (for Session and Event data) and Bulk Timestream Storage (for Timestream data).

Bulk Timestream Storage is where the actual data of Timestreams are stored and managed. In the case of video, this consists of long, bulky sequences of digitized and compressed video frames. In the Timestream Architecture, the management of Timestream data is relegated to the various Media Servers, which can choose to store their data in whatever way they deem most appropriate. In the currently preferred embodiment, most of the Media Servers store their data in ordinary Unix files; but Media Servers for other storage mechanisms (e.g., a computer-controlled VCR for analog storage of audio/video timestreams) have also been implemented. It is even possible for a Media Server to use the Timestream Database for its Timestream data, which may be the most expedient mechanism for a Timestream with intermittent, low-bulk data (e.g., the textual notes produced by a laptop computer).

The Timestream Database is a repository for storing and retrieving Session and Event data, i.e., the data that organizes all the information into Sessions and describes the constituents of Sessions. The Timestream Database supports the user in locating a desired Session, determining which Timestreams are associated with that Session, and finding Events that are associated with the Session and its Timestreams. The Timestream Database should not only support the browsing of the Session data, but also a database querying capability to allow selective retrieval of Sessions and Events. Session and Event information must persist for months and years, and thus must be stored on non-volatile devices (usually disks). Since the Timestream Architecture is object-oriented, an object-oriented database is appropriate as a persistent object store for the Timestream Database. However, the timestream database may also be implemented on top of a standard relational database. In the currently preferred embodiment, the Timestream Database is implemented on top of the Unix file system.

Analyzers

Temporal data analysis is particular to the information captured by the timestream and the desirable events to be extracted. In the case of a timestream of audio information, one useful form of an event is knowing when a particular person is speaking. Thus, it is desirable to analyze the audio stream to 1) segment the timestream to indicate when different persons are speaking, and 2) assign the various segments to the person speaking. These segments would then represent events in the timestream. Techniques for performing such an analysis on an audio stream are described in co-pending applications Ser. No. 08/226,525 entitled "Unsupervised Speaker Clustering For Automatic Speaker Indexing Of Recorded Audio Data", and Ser. No. 8/226,519 entitled "Segmentation Of Audio Data For Indexing Of Conversational Speech For Real-Time Or Postprocessing Applications", both of which are assigned to the same assignee of the present application. In any event, once such analysis is performed, the list of events for an audio timestream will comprise a plurality of data items each containing a timestamp, duration and speaker identifier.

In the case of analysis of a timestream captured by a LiveBoard, an event may be the drawing of a figure or the writing of a word, a page change, erasures of figures or words, annotations made on existing markings, or the entering of a particular command to the LiveBoard user interface. As described above, the LiveBoard operates under the control of the Tivoli application. The timestream generated by Tivoli is a history, list of timestamped primitive operations recorded in temporal order. The analysis of such a timestream involves parsing the sequence of primitive operations to identify significant events.

Each marking on the LiveBoard is referred to as an object. Each object has one or more events associated with it. It is fundamental to the present invention that all the events related to an object are identified and provided to a user as an index into the session. Accordingly, temporal data analysis in the present invention identifies the various events on objects and stores the events. For every object there is an object-creation event. The object may also have object-altering events and an object-deletion event. Further aspects of the LiveBoard timestream are discussed below with respect to the LiveBoard window.

Session Access Workstation

Figure 2:
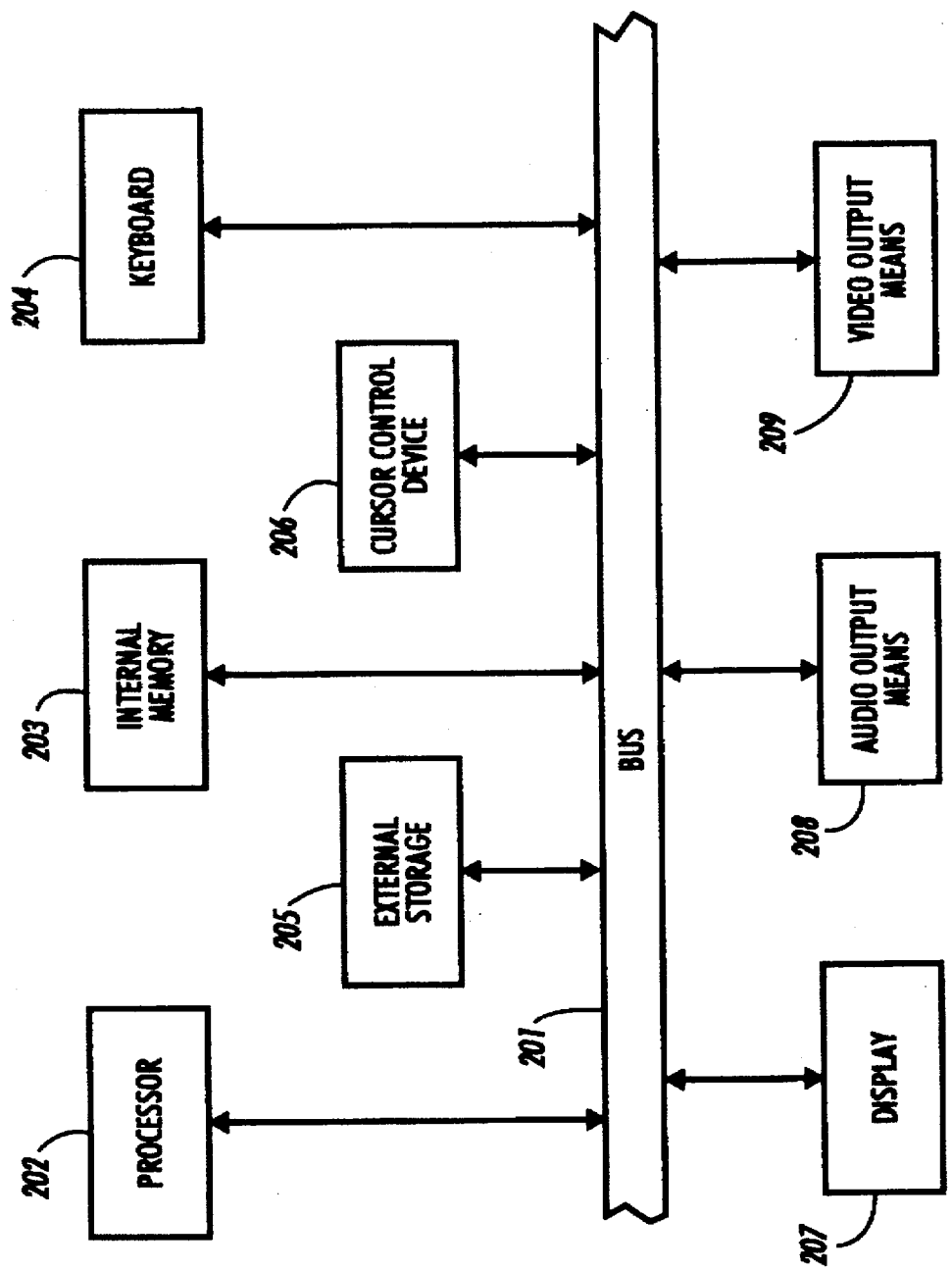
FIG. 2 is a block diagram of a session access workstation as may be utilized in the currently preferred embodiment of the present invention.

In the currently preferred embodiment, the session access workstation is a computer controlled display system operating under the control of program instructions stored on a storage medium and is described with reference to FIG. 2. Referring to FIG. 2, the computer based system is comprised of a plurality of components coupled via a bus 201. The bus 201 illustrated here is simplified in order not to obscure the present invention. The bus 201 may consist of a plurality of parallel buses (e.g. address, data and status buses) as well as a hierarchy of buses (e.g. a processor bus, a local bus and an I/O bus). In any event, the computer system is further comprised of a processor 202 for executing instructions provided via bus 201 from Internal memory 203 (note that the Internal memory 203 is typically a combination of Random Access or Read Only Memories). When in operation, program instructions for carrying out the various functional components of the present invention are stored in internal memory 203. The processor 202 and Internal memory 203 may be discrete components or a single integrated device such as an Application Specification Integrated Circuit (ASIC) chip. The processor 202 and internal memory 203 comprise circuitry for performing the various processing functions described herein.

Also coupled to the bus 201 are a keyboard 204 for entering alphanumeric input, external storage 205 for storing data, a cursor control device 206 for manipulating a cursor, and a display 207 for displaying visual Output. The keyboard 204 would typically be a standard QWERTY keyboard but may also be a telephone like keypad. The external storage 205 may be a fixed or removable magnetic or optical disk drive. The cursor control device 206 will typically have a button or switch associated with it to which the performance of certain functions can be programmed. Further coupled to the bus 201 is audio output means 208. The audio output means 208 is typically comprised of some audio signal generation means (e.g. a Digital to Analog Converter) and a speaker. The audio output means 208 may also act as a player. Finally, coupled to the bus 201 is a video output means 209. The video output means is typically a commercially available processing means, e.g. a video board, for enabling a video signal to be displayed on display 207.

While the session access workstation is embodied on a computer based system operating pursuant to programmed instructions stored on a storage medium, the present invention could be practiced on any computer controlled display system, such as a fixed function terminal or a LiveBoard.

Figure 3:
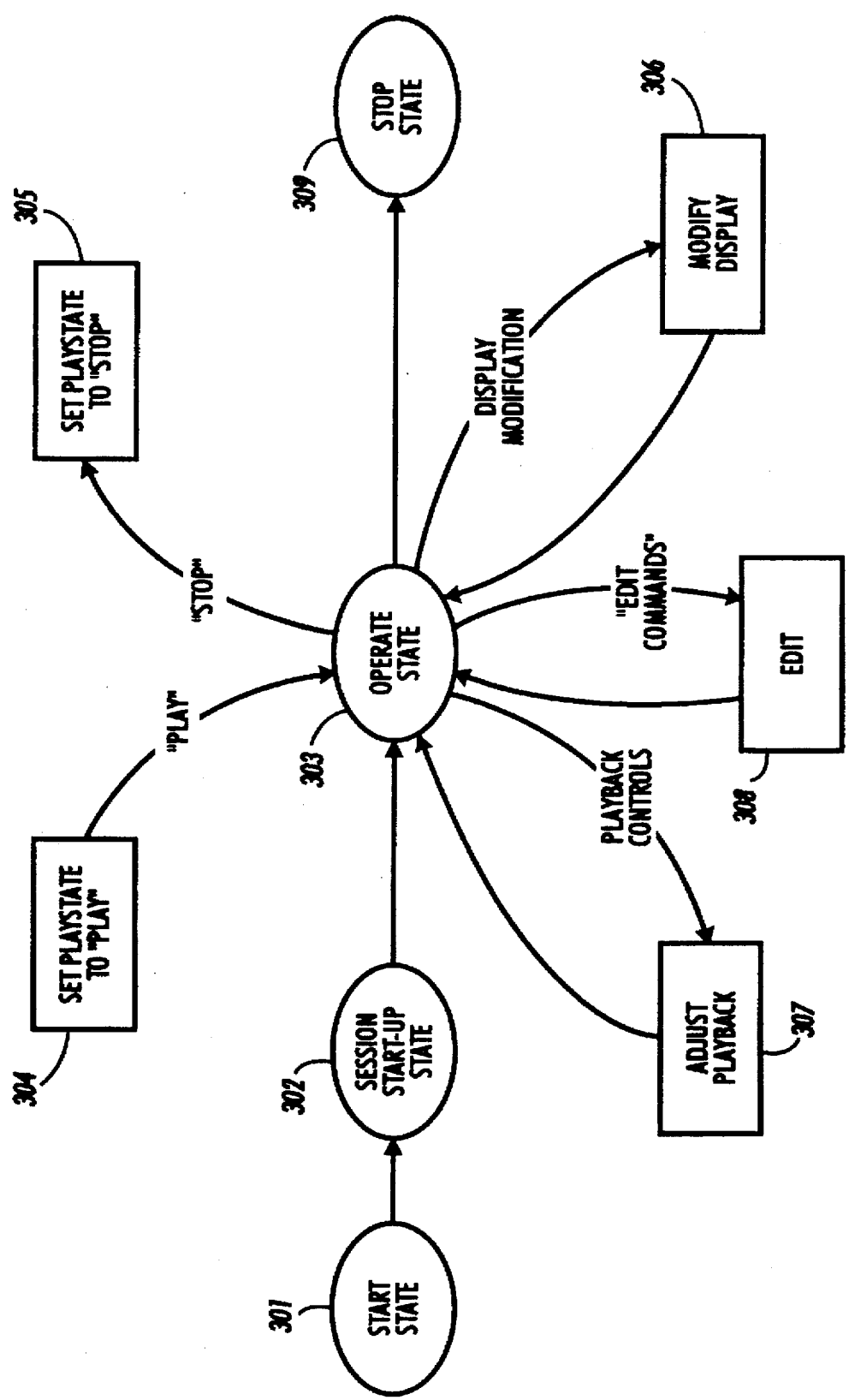
FIG. 3 is a simplified pseudo-state of the operation of the session access workstation of the currently preferred embodiment of the present invention.

The session access workstation operates using program instructions for playback and control as described above with reference to the timestream architecture. FIG. 3 is a simplified state diagram illustrating the basic lowlevel operation of the session access workstation. Referring to FIG. 3, the session access workstation is initially in a start state 301 when a request to playback a session is received. A session start-up state 302 is then entered. During the session start-up state 302, the session or sessions to be played back are selected by the user. The temporal data of the selected sessions are retrieved and the various players, controllers and editors are synchronized. Note that the various players may be integrated into the same physical device as the session access workstation, or they may be separate devices. The various windows (i.e. players, playback controllers and editors) are then displayed on the display coupled to the session access workstation. At this point, what is termed an "operate" state 303 is entered. The operate state 303 described here is used to convey the notion that the session access workstation is interactive and that the various functions of the user interface for the session access workstation can be invoked at any time. In any event, when the "operate" state 303 is initially entered, the session is cued to playback the session from the beginning. While in "operate" state 303 various primitive functions are performed responsive to user input. Invocation of a "play" command or equivalent graphical user interface input (e.g. clicking on a particular icon) will cause playback of the session to commence (box 304). This causes a playstate to be set to "play". Invocation of a "stop" command will cause playback of the session to cease and the playstate to be set to "stop" (box 305). Invocation of "display modification" commands or controls while in a particular window will cause the window to be modified (box 306). Such modifications may be to change the tracks displayed in a timeline interface. Invocation of playback controls will cause the playback point to change (box 307). This will cause the replay of the session to be cued at a new point. Invocation of edit commands will cause either modifications to existing temporal data, or the creation of new temporal data (box 308). Upon initiating the operations in the various states, returning to the operate state 303 occurs.

It should be noted that multiple of such operations may be invoked in order to accomplish a particular function on the session access workstation. For example, an operation to select objects in the LiveBoard window may invoke a "stop" followed by a "modify display."

Finally, invocation of an "exit" command while in operate state 303 will cause the access session to be halted (stop state 309).

Display of Session Access Workstation

Figure 4:
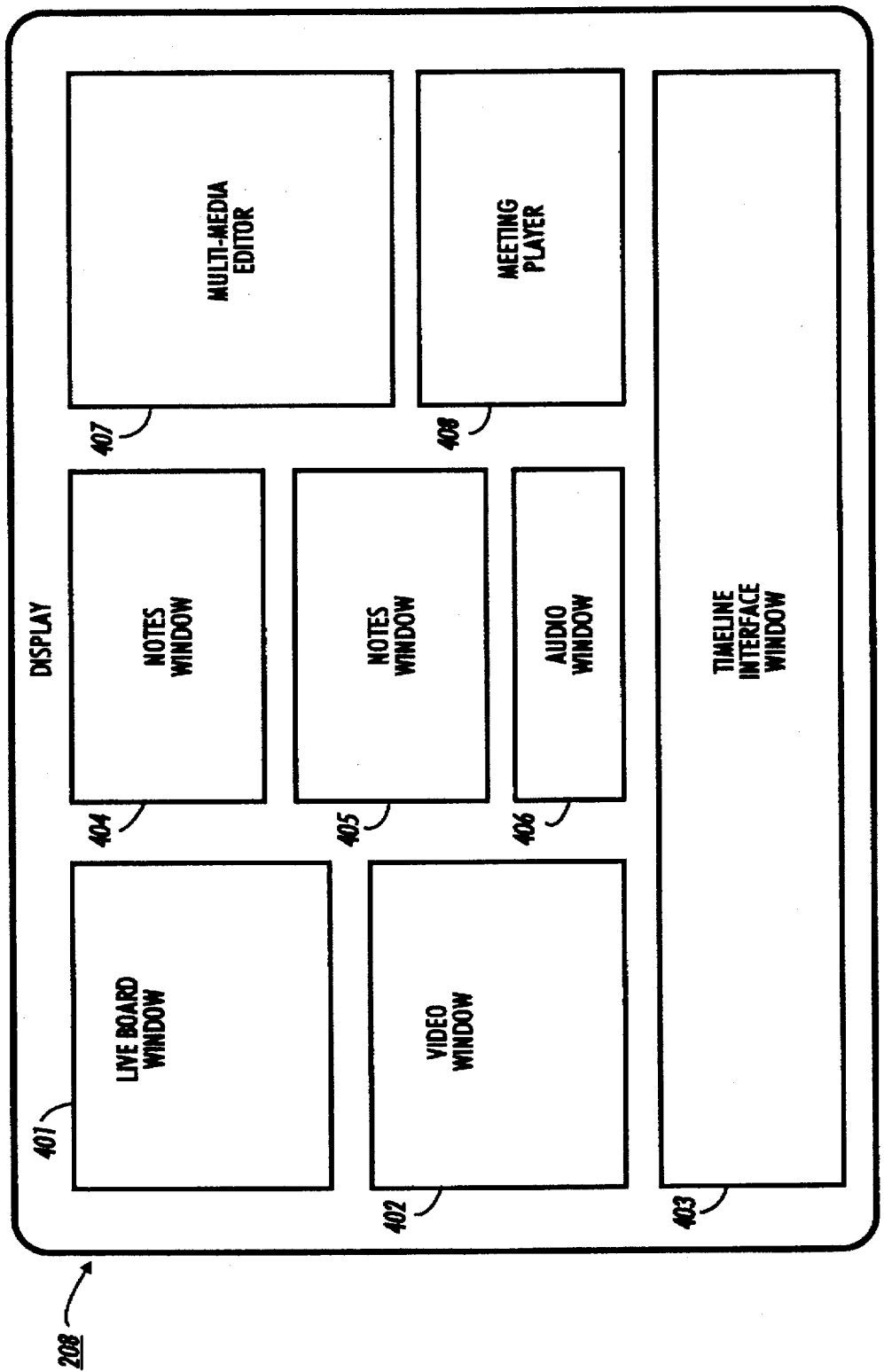
FIG. 4 is an illustration of a visual user interface of the display coupled to a session access workstation in the currently preferred embodiment of the present invention.

FIG. 4 illustrates the screen display of the session access workstation. The screen display of FIG. 4 shows a plurality of windows that are open concurrently. As for most windows oriented graphical user interfaces, the size and placement of the windows is at the choice of the user. Referring to FIG. 4, what is concurrently displayed is a LiveBoard Window 401, video window 402, timeline interface window 403, notes windows 404-405, audio window 406, multi-media editor window 407 and meeting player window 408. The LiveBoard window 401 may operate as a player, playback controller or as an editor. As a player it is used to playback a LiveBoard timestream. As a controller it enables control of the replay of the session through interaction with objects displayed therein (described in greater detail below). As an editor, a user may create new objects or make specific annotations relating to the session which may be displayed in subsequent replays of the session.

The Video Window 402 is a player that is used to playback a video timestream. Notes windows 404 and 405 are players used to playback notes that may have been taken on a laptop computer, or like device, that was enabled as a capture device during the course of the meeting.

The Meeting player window 408 is a player and playback controller. The meeting player window 408 provides a simulation of the dynamics of the meeting as it is played back, using the events of the various other temporal data. Playback is controlled though interaction with various icons presented in the meeting player window 408. The meeting player window is described in greater detail below.

Audio window 406 is a controller used to control the replay of the audio timestream, in particular the speaker volume for the audio replay of the session.

Multi-media editor 407 is an editor that is used to create notes, event or other information which may be introduced back into the session as a timestream. Further, the multi-media editor 407 may be used to create multi-media documents that do not require the session access workstation to be viewed.

The timeline interface window 403 is a playback controller. The timeline interface window 403 embodies a temporal based view of the events as they occurred during a session. The timeline interface window 403 is described in greater detail below.

Timeline Interface

The timeline interface of the currently preferred embodiment of the present invention provides playback control through interaction with a representation of events along a timeline. Events may be either of a fixed duration, or be open ended (wherein only the creation time is of significance). During session start-up, event data is loaded into the session access workstation. The event data is used to create visual indicators that are scaled on a timeline. These visual indicators may be used as index points to move replay directly into corresponding time points of the session. The internal structure for organizing the event data into the timeline representation is now described.

The loaded event data is organized to give a user a simple way to control the event data. This organization is defined by a Type Map, an Event Menu and a Track Map. All event types have hierarchic names called Htypes. For example:

Speaker/Adam

LiveBoard/Edit/Move

Button/Betty

Note/Laptop/Charlie.

A user defined Type Map is used for creating such Htypes. The Type Map is a set of rules that takes the parameters of each Event and produces an Htype. The set of Htypes are then arranged into a simple hierarchic event menu that is presented to the user in the label area of a time track area. All events may be displayed to the user onto Tracks. The layout is defined by the Track Map. The Track Map is a list of Tracks, each with a list of Htypes that are represented on the corresponding Track.

Figure 5:
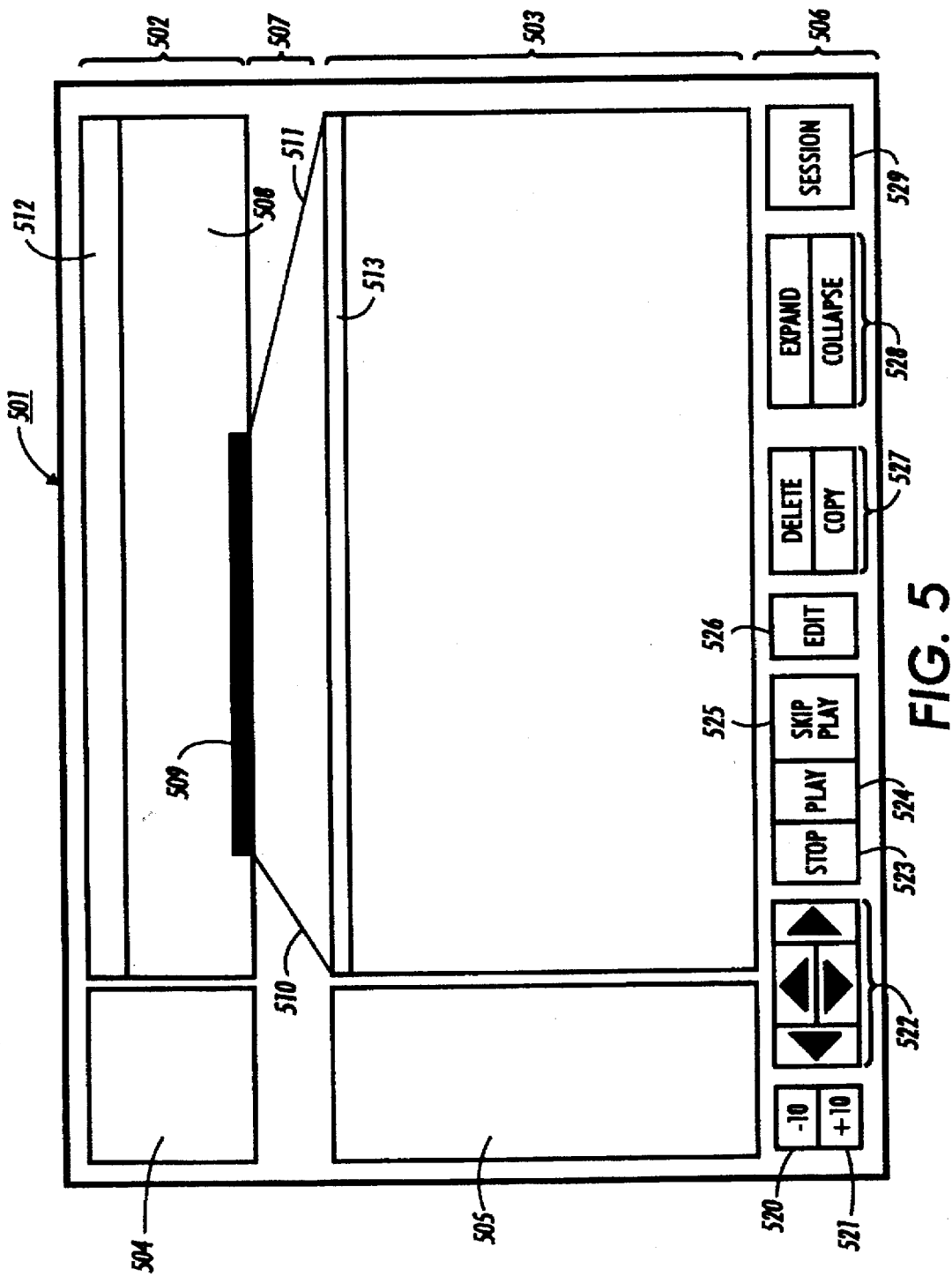
FIG. 5 is an illustration of a timeline user interface display for a session in the currently preferred embodiment of the present invention.

Visual indicators are created for each of the Htypes. Visual indicators can be of any graphical styles, but two general classes of visual indicators are most commonly used. The first class is termed segments. Segments are displayed on the timeline, as rectangular boxes that are sized and scaled to correspond to the duration over which the event occurs. The second class is termed startpoints. These are displayed on the timeline as triangles whose left edges are vertically positioned at the points in time that the events began, and whose rights sides "point" to the right to indicate that the activity corresponding to the events continue indefinitely. For such events, there is no concern about the duration of the event (e.g. an event indicating that a person is beginning to take notes). Various operations may be performed with respect to the Visual Indicators. Operations on Visual Indicators include:

Create Visual Indicator (given type or Typed by default)
  Select Visual Indicator(s)
  Unselect Visual Indicator(s)
  Move Visual Indicator to different Track (times stay same)
  Copy Visual Indicator to different Track (times stay same)
  View more information about Event represented by Visual Indicator
  Edit selected Visual Indicator's display parameters
  Edit Visual Indicator times
  Adjust Visual Indicator begin time
  Adjust Visual Indicator (segment) end time
  Adjust Visual Indicator time position FIG. 5 illustrates the basic areas in the timeline window. Referring to FIG. 5, the timeline window 501 is comprised of a plurality of display areas. An overview time track area 502 is used to provide an overview of the session, and a focus time track area 503 provides more detailed information over a duration less than or equal to the entire session. It should be noted that operation of each of the track areas can provide the same type of temporal information. The difference is the scale which the information is intended to detail (i.e. the entire session versus a portion of the session).

Defined within overview time track area 502 is clock area 512 and defined within focus time track area 503 is clock area 513. Each of the clock areas 512 and 513 present the clock times and tick marks to indicate the time span and scale of the corresponding time track area. The overview time track area 502 has defined within it a special track termed the focus track 508. Lying on the focus track 508 is a focus segment 509. The focus segment 509 corresponds to a duration of the session detailed in the focus time track area 503. Further associated with each time track area is a label area. Each label area is for identifying the "tracks" which are displayed in the corresponding time track area. The label area 504 corresponds to the overview time track area 502 and the label area 505 corresponds to the focus time track area 503. The relationship between the overview time track area 502 and the focus time track area 503 is indicated in focus area 507. This relationship is made visually apparent by arms 510 and 511 which extend from the ends of the focus segment 509 to the ends of the focus time track area 503.

Also illustrated in FIG. 5 is a button area 506. The button area 506 is a static area that contains "soft" buttons for invoking various playback control functions. Such buttons are invoked by using a cursor control device in a point and click fashion. The arrangement and functions of the buttons is exemplary and is intended to provide simple access to specific commonly used functions.

The button 520 is used to cause playback to skip back in time 10 seconds and the button 521 causes playback to skip forward in time 10 seconds. The directional arrows in button group 522 provide for context sensitive movement or scrolling. The button 523 provides for stopping the replay of the session. The button 524 initiates the playing of the session. The button 525 permits skipping to next events on a selected track or set of selected tracks. The button 526 provides for entering an Edit mode to modify the timeline interface or the visual indicators displayed thereon. The button group 527 provides for context sensitive deleting or copying (e.g. copy or delete a visual indicator). The button group 528 provides for context sensitive expand and collapse (e.g. collapse a set of tracks into a single track, or expand a collapsed set of tracks) The button 529 is used to display a session menu. The session menu enables the user to load data for sessions, save sessions or quit sessions.

Figure 6:
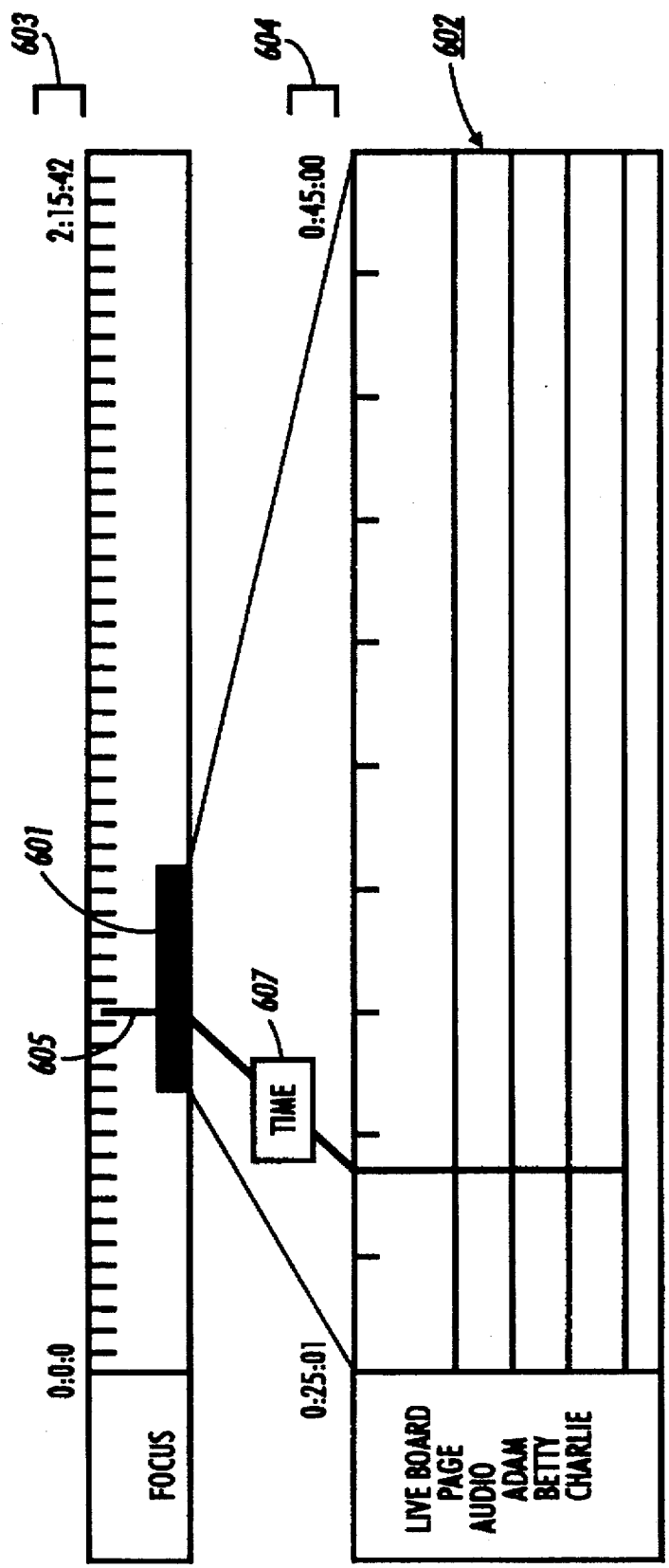
FIG. 6 is a simplified illustration of a timeline interface highlighting the relationship between the overview time track display area and the focus time track display area.
Figure 7:
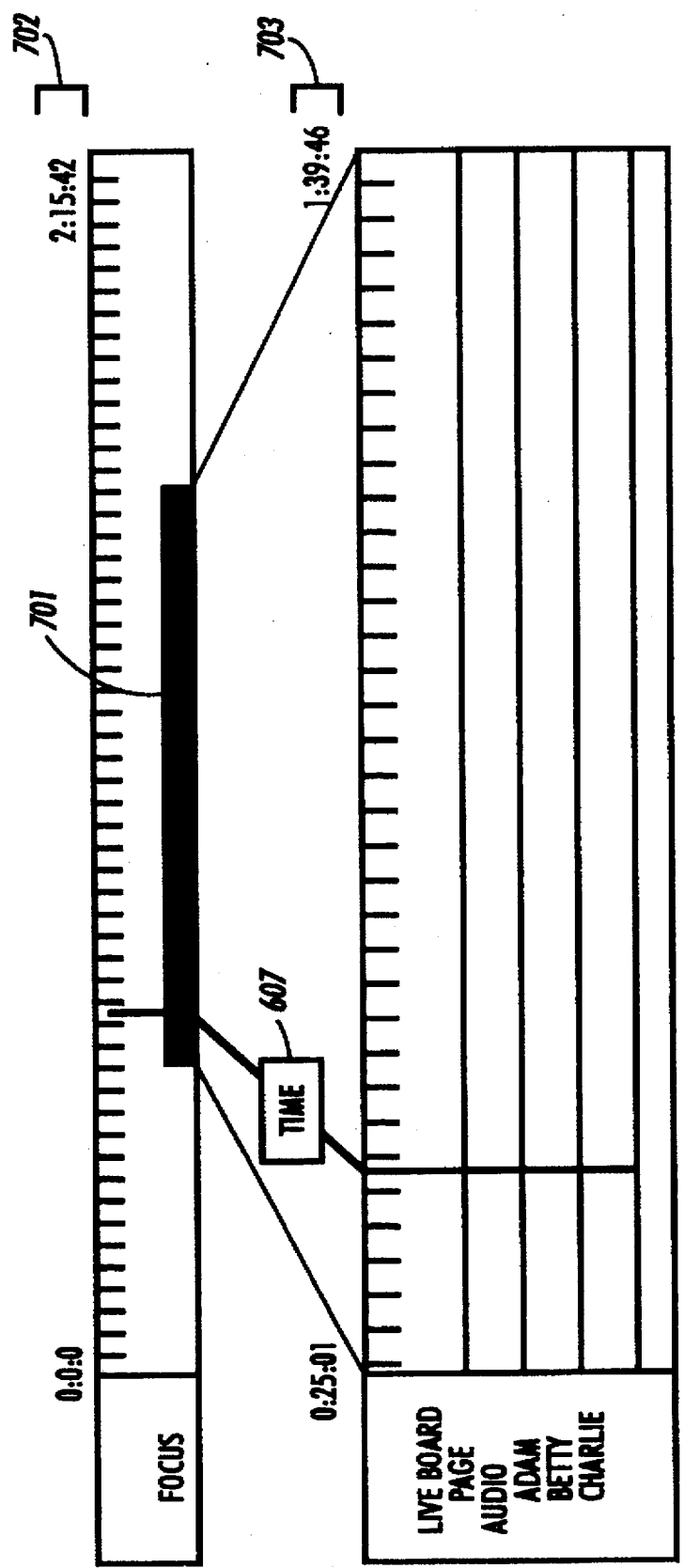
FIG. 7 is an illustration showing the result of an operation where the focus bar of FIG. 6 is stretched and the focus time track display area scaled accordingly.

As noted above, the portion of the session being shown in the focus time track display area is indicated by a focus segment contained on a focus track of the overview time track area. In order to change the span of focus in the focus time track area, the focus segment is re-sized by the user. This is illustrated in FIGS. 6–7. In FIG. 6, the focus segment 601 indicates a portion of the session that is shown in focus time track area 602. Other visual cues identifying this relationship include the changes to the respective clock areas 603 and 604, namely the re-sizing of tick marks and the respective beginning and end times for the time track areas, and the relative positioning of the time indicators 605 and 606. Also, indicated in FIG. 6 is playback time indicator 607 which indicates the current playback time.

Re-sizing the focus segment is accomplished by various cursor control operations. In the currently preferred embodiment, a button depressed on the mouse while the cursor is positioned on the right edge of the focus segment causes the focus segment to be stretched in the direction of movement of the cursor. The left side of the focus segment is manipulated in the same manner.

FIG. 7 is an illustration of the result of the right side of the focus segment 701 having been stretched to the right to increase the span shown in the focus time track area. This increased span is also reflected by changes in the clock areas 702 and 703 (re-scaling of tick marks and a change in the end time for the focus time track area.)

Figure 8:
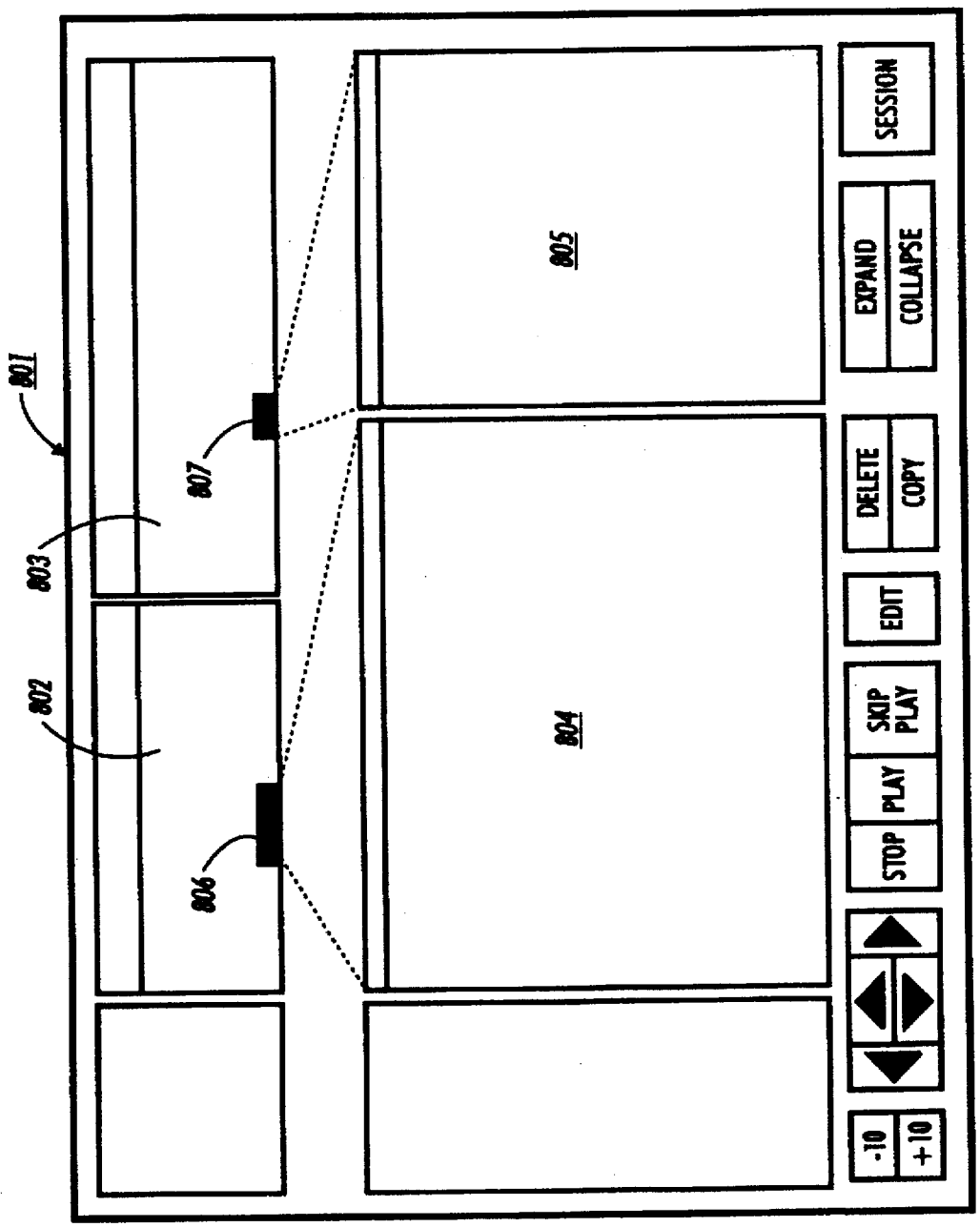
FIG. 8 is an illustration of the timeline user interface display system for controlling playback of two sessions.

The timeline interface can be used to control playback of multiple sessions or to focus on multiple spans of a single session. FIG. 8 is an illustration of a timeline interface for two sessions. The two sessions may represent the morning half and afternoon half of an all-day meeting. Or they may represent different occurrences of a regularly scheduled meeting such as a weekly project review meeting. Typically, the two sessions will have some commonality. Referring to FIG. 8, the timeline interface window 801 is comprised of two overview time track areas 802 and 803 and corresponding focus time track areas 804 and 805. Focus segment 806 indicates a span in the session corresponding to overview time track area 802 and the detail for that span in focus time track area 804. Similarly, focus segment 807 indicates a span in the session corresponding to overview time track area 803 and the detail for that span in focus time track area 805. The actual tracks show in the respective focus time track areas 804 and 805 need not be the same. If they are different, separate label areas would be needed. This may be undesirable as taking up too much space in the display area.

Figure 9:
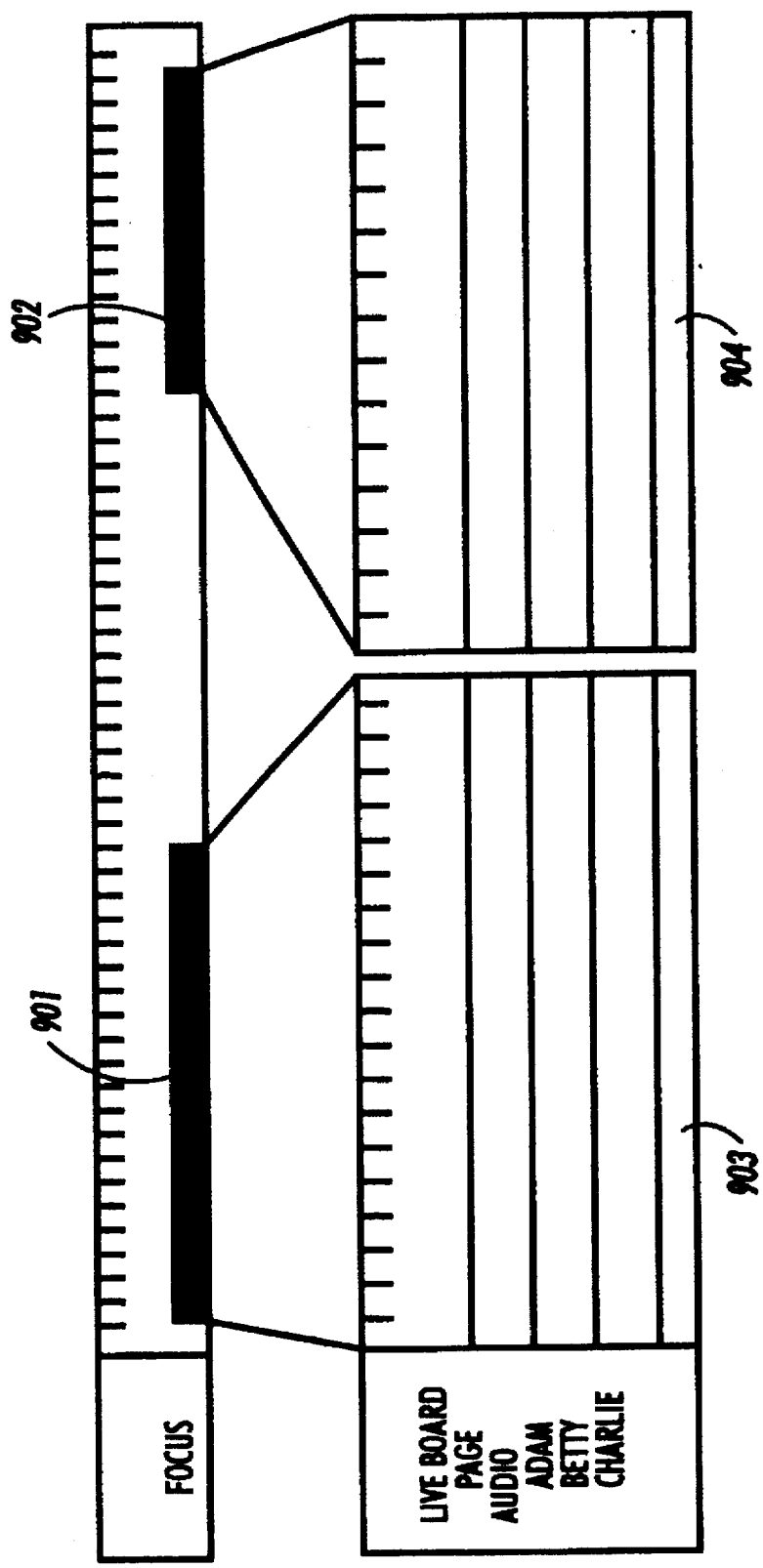
FIG. 9 is an illustration of a timeline interface wherein two non-contiguous focus segments are presented in the overview time track area and the focus time track area contains the detail of each focus segment.
Figure 10:
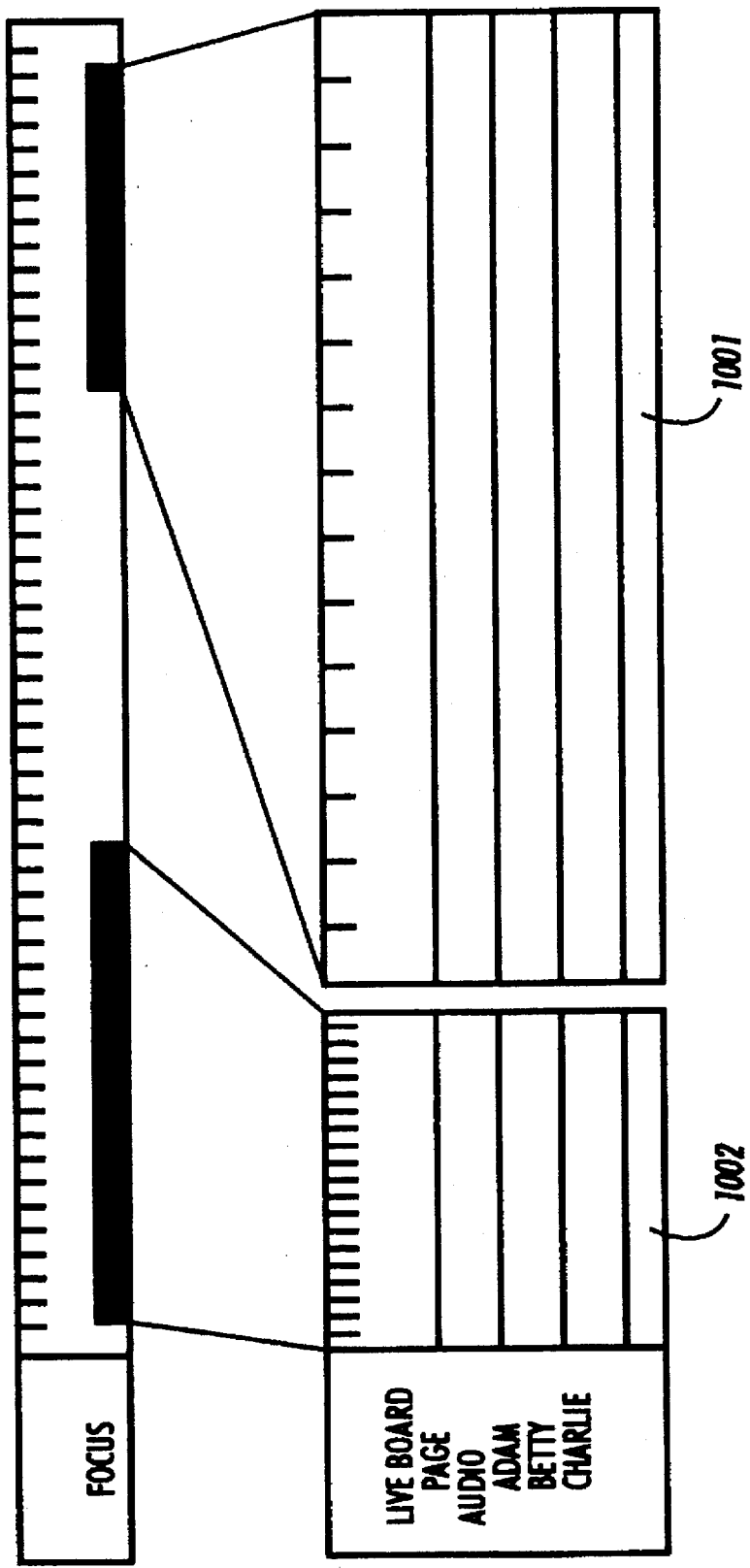
FIG. 10 is an illustration of a timeline interface showing the result of resizing one of the focus time track areas of FIG. 9.

FIG. 9 is a further illustration that indicates that the detail of multiple spans of a single session may be displayed in the focus time track area. This causes multiple focus segments to be displayed on the focus track of the overview time track area. Referring to FIG. 9, a first focus segment 901 has detail shown in a corresponding area 903 in the focus time track area while a second focus segment 902 has a corresponding area 904 in the focus time track area. Such a display may be desirable when it has been determined that there are certain areas where there is no interest in replaying (e.g. if you know beforehand that you only want to review discussion relating to particular pages on the LiveBoard). By default, the focus time track area will be divided evenly between the two focus segments and be on the same scale. However, as illustrated in FIG. 10, the portion of the focus time track display allocated to a session duration can be modified. Here, the area 904 of FIG. 9 has been increased to the area 1001 of FIG. 10, and the area 903 of FIG. 9 has been decreased to area 1002 of FIG. 10. This increase of size may be performed by a drag operation moving the left side of the area 904 to the left.

FIGS. 11–14 illustrate variations on a timeline interface display for a system comprising the following capture devices: a LiveBoard, an audio recorder, two user taking notes on personal computers, a video recorder and a button for each user. Of course, other combinations of capture devices may be utilized or events from some capture devices may be omitted, which would result in a different timeline interface display. The session attendees for this example are named Adam, Betty and Charlie.

Figure 11:
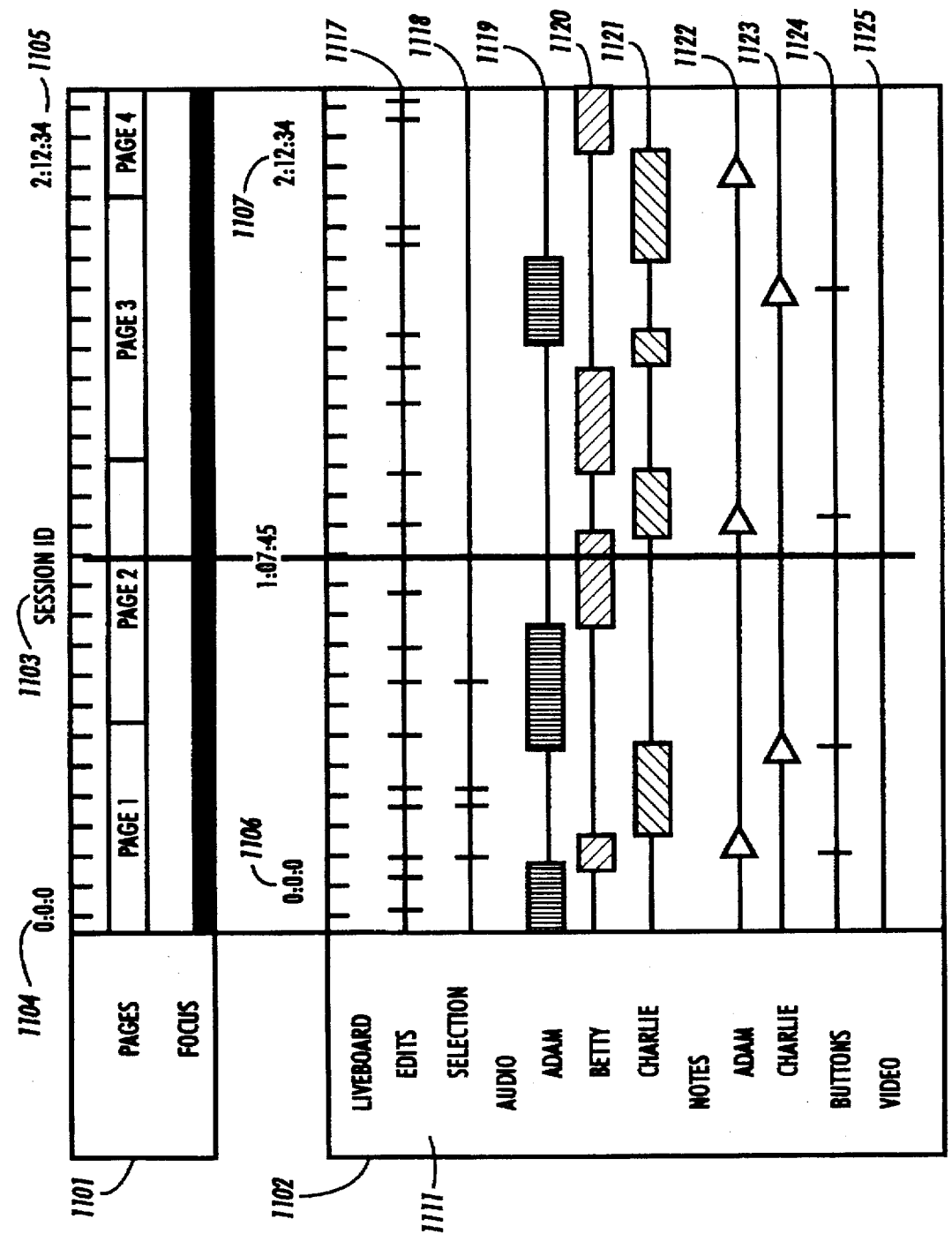
FIG. 11 is an example of a timeline interface for replay of a session recorded with a plurality, of capture devices, including a Selection Track resulting from a selection operation on a LiveBoard window.

Referring to FIG. 11, overview time track area 1101 displays information for the entire session and has a focus segment indicating the entire session. Thus, focus time track area 1102 displays the detail of the entire session. Playback indicators 1113 and 1114 indicate the current playback location within their respective time duration's.

Further associated with the session area 1101 is session identifier 1103. The session identifier identifies the session being played back.

Information provided related to the overview session time track area, and thus the entire session includes the session start time 1104, and the session end time 1105. Each of the session start time 1104 and session end time 1105 may indicate the actual time of day that the session occurred or be relative to a session start time of 0:0:0 (as illustrated in FIG. 11).

Information related to the focus time track area 1102 includes the span start time 1106 and the span end time 1107. Each of the span start time 1134 and span end time 1135 may be in terms of the actual time of day of the particular span, or be relative to a session start time of 0.

The focus time track area 1102 includes a track label section 1111 for providing information about what each track represents. Tracks 1117 and 1118 indicate editing events performed on the LiveBoard. Track 1118 is generated responsive to a selection operation performed in the LiveBoard window and is described in greater detail below. The track 1117 indicates various editing operations performed on objects on the LiveBoard. On track 1117, each editing operation has a unique color coded visual indicator. So the color red may represent the deletion of an object, the color green the addition of an object and the color blue the movement of an object.

Tracks 1119–1121 indicate audio events. The track 1119 indicates segments where "Adam" is speaking, the track 1120 indicates segments where "Betty" is speaking, and the track 1121 indicates segments where "Charlie" is speaking. Each of the visual indicators of segments when a participant is speaking is visually distinct (typically by color or texturing).

Tracks 1122–1123 indicate the start point of notes that were taken by meeting participants Adam and Charlie. The notes were taken on a personal computer or other text creation device that is operating as a capture device.

Track 1124 indicates instances of the event of "button" pressing. Each meeting participant has a button that may be depressed when the participant feels that something significant is being discussed. Again, the visual indicators are color coded to identify the person who depressed the button. So for example blue indicates Betty depressed her button and green indicates that Charlie depressed his button.

Track 1125 indicates instances of events relating to the video timestream. Such events may include a person standing to speak, or some type of gesturing with respect to a whiteboard. Such events would be identified through analysis of the video timestream.

As described above, the selection track 1118 is automatically generated as a result of a selection interaction in the LiveBoard window. The selection interaction is one where various objects (e.g. words, or diagrams) that are displayed on the LiveBoard are selected. Events relating to the selected object(s) are then displayed on the timeline window. It should also be noted that selection may occur with respect to a spatial area. In such a selection, an area is selected and events for objects that were located in the selected area are displayed on the timeline. This would be particularly useful to replay portions of a session where markings were erased from the LiveBoard (e.g. during the process of replaying, a skip is made and it is noticed that an object has been erased, or it has been replaced with another object.) Referring back to FIG. 11, various selection events are illustrated. Again, preferably the visual indicators are color coded to indicate the type of event. A creation event 1127 indicates a point in time where an object was created, a move event 1128 indicates the point in time where the object was moved on the LiveBoard, a change color event 1129 indicates that the object color was changed, and a delete event 1130 indicates that the object was deleted.

Figure 12:
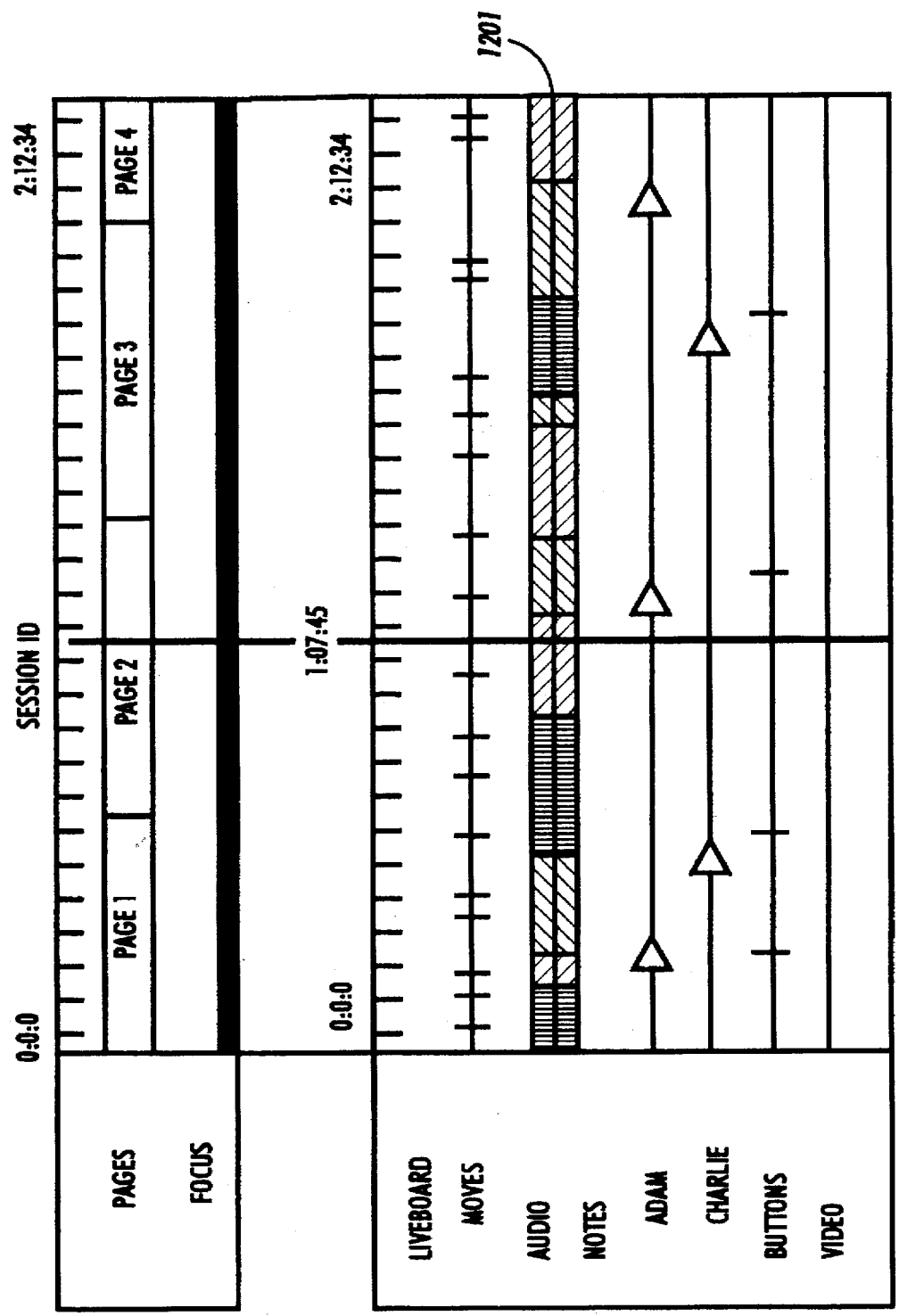
FIG. 12 is further illustration of the timeline user interface display showing the results of merging the audio tracks of FIG. 11 onto a single track.

The content of each of the time track areas is user modifiable. Tracks may be merged, added, hidden or moved. In order to modify the contents of a time track area operations are performed within the corresponding label section. For example, with reference to FIG. 11 the audio tracks 1119–1121 may be selected and merged. The results of such merged tracks is illustrated in FIG. 12, where merged track 1201 has been created. Selection of tracks may be accomplished by operating the cursor control device by depressing a switch associated with the cursor control device and moving the cursor in a manner such that it passes over the labels of the track. Indication of selection of labels is accomplished through some visual stimulus such as presenting the selected labels in a reverse video mode. Confirmation of selected labels is accomplished by releasing the switch. At this point various track operation options may be presented. The user would then select the desired operation (in this case a merge operation). This is but one way in which track display operations could be performed. Other techniques could be invocation through pull down menus or through commands entered on a command line.

Figure 13:
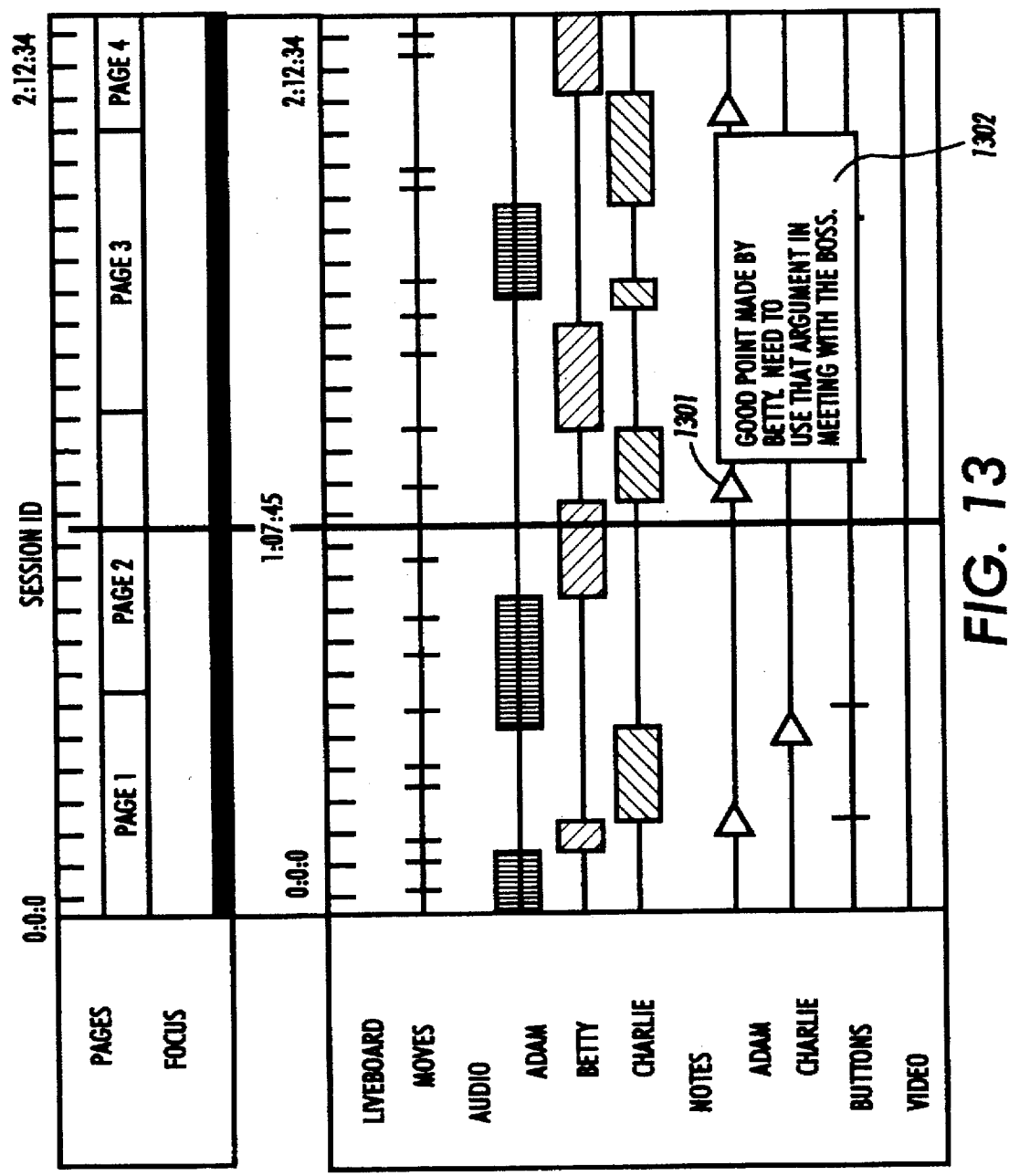
FIG. 13 is a further illustration of the timeline user interface display of FIG. 11 showing the results of opening a note on a note track.

Operations on Tracks include:
Select Track(s)
Unselect Track(s)
Create Track (given Htypes)
Reposition selected Track
Delete selected Track(s)
Collapse selected Tracks (into one Track)
Expand selected Track (into a sequence of Tracks based on its Htypes)
Edit Display Parameters of selected Track(s)
Edit Track Label A point and click operation on the different visual indicators may cause different things to occur. In each case, the subsequent playback of the timestreams will be set to the time corresponding to the beginning of the visual indicator. In the case of Notes, a window containing the text in the note is opened. The occurrence of such an operation is illustrated in FIG. 13. Referring to FIG. 13, the visual indicator 1301 has been pointed to and the switch on the cursor control device clicked. This causes a text window 1302 to be opened containing the text generated during the meeting (here the text "Good Point Made By Betty. Need to Use that Argument in Meeting With the Boss"). It should be noted that the text window may also be presented in a different location outside the time track display area.

It should be noted that the timeline may be displayed with a vertical or horizontal orientation, or used in combination with other visualization techniques for showing long strings of sequenced data.

Meeting Player/Controller

Figure 14:
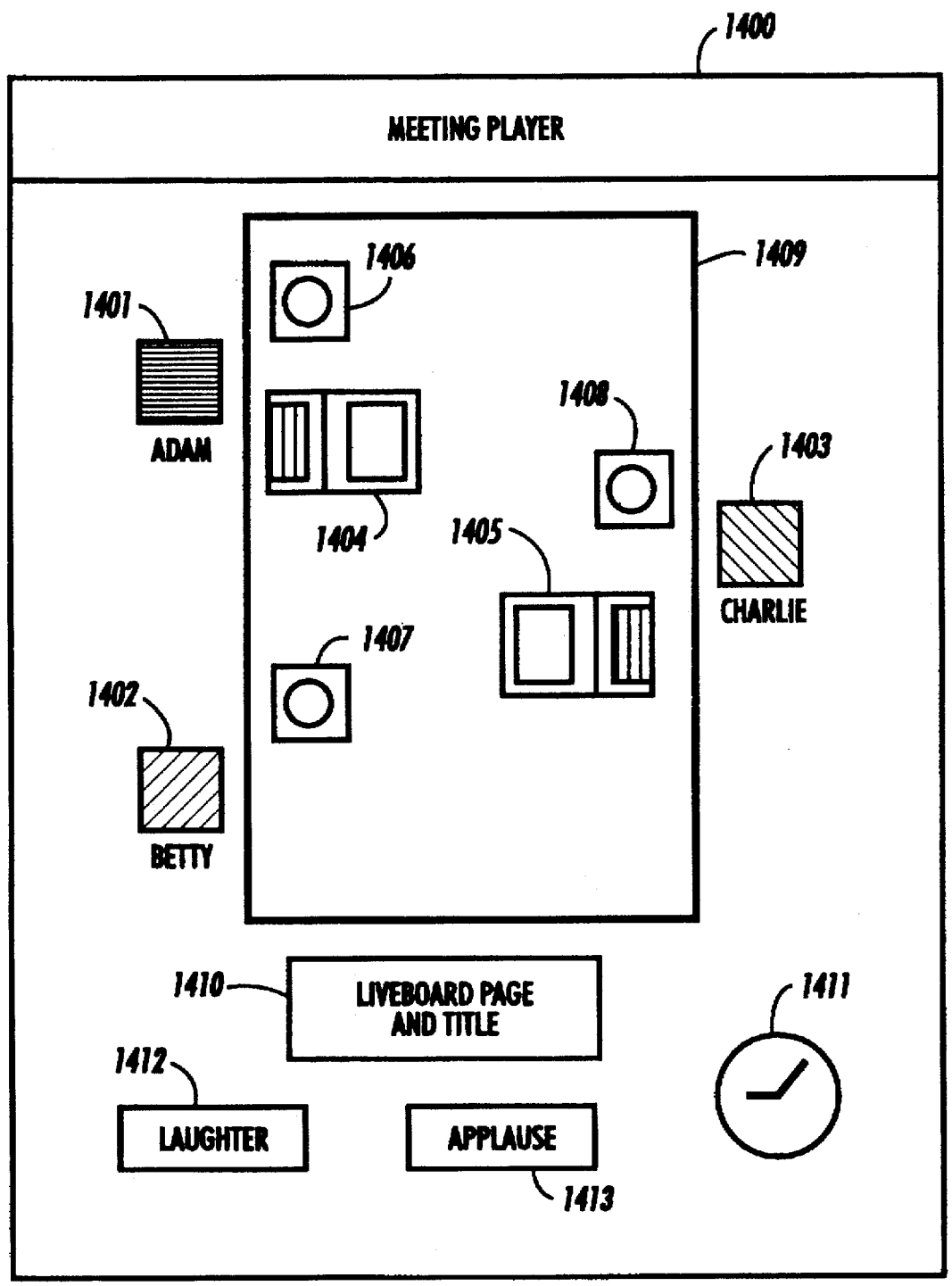
FIG. 14 is an illustration of a meeting player for the same session used to create the timeline user interface of FIG. 11.

The form of a player is not limited to playback of the temporal data of a session in the exact same form as it was created. An example of such a player is the meeting player. A meeting player is used to visually represent various meeting dynamics. This may be useful for example when a person may not be able to recognize the voices being replayed, but wishes to identify the speaker. The meeting player of the present invention simulates the activities as they are taking place during the meeting. FIG. 14 illustrates a window 1400 displaying a meeting player. Referring to FIG. 14, the meeting contains visual indicators 1401–1403 each representing a meeting participant, visual indicators 1404 and 1405 represent note taking devices (e.g. laptop computers) and the visual indicators 1406–1408 represent "buttons". During play back, the icons representing current events that are occurring are highlighted. Here, the icon 1401 is highlighted so the speaker represented by icon 1401 is speaking. Likewise, when someone presses a button, the corresponding button icon would be displayed as highlighted.

Note that it would be possible to include within the speaker icon a thumbnail image of the speaker. It may also be desirable that each of the associated icons may maintain the same visual characteristic as the corresponding track on the timeline. So if the speaker icon 1401, button icon 1406, and personal computer icon 1404 were associated with Adam, who had a visual characteristic of blue, these icons would be blue. However, it is recognized that there may be situations where this would not be possible due to limitations in the number of displayable colors or other factors.

Further displayed in the meeting player window are a LiveBoard page and title indicator 1410 and a clock 1411. The page and title indicator 1410 indicates the "page" that is currently being viewed on the LiveBoard at this instant of the playback. The clock 1411 indicates the playback time. A table 1409 is also displayed to provide a visual cue as to the fact that the session represents a meeting.

The meeting player may also be used to change playback to a different speaker. This enables the user to easily traverse the meeting by a particular speaker. Switching to the different speakers is accomplished by a "point and click" operation on the icon of the desired speaker. This will cause the playback to jump to the next point in time for the selected speaker. Moreover, this operation may work for any icon, where a jump to the next instance of an event associated with the selected icon is made (e.g. the Page and title indicator 1410 could be subject to a "point and click" operation to skip the replay to the beginning of the next page of the LiveBoard). Thus, the meeting player in this instance further operates to control playback of the session.

The meeting player may be designed to indicate various other events that can be analyzed. For example, a "laughter" icon 1412 or "applause" icon 1413 can be provided to indicate when laughter or applause is occurring, or to skip to a next temporal occurrence of laughter or applause. Further, while the preferred embodiment is used to represent a meeting, other types of activities, e.g. presentations, could be represented in a similar fashion.

LiveBoard Window

The LiveBoard Window of the currently preferred embodiment simultaneously operates as a player of the LiveBoard timestream, a playback controller, and an editor. The LiveBoard window is based on the aforementioned Tivoli software. The LiveBoard window operates in different playback modes: an animated mode reconstructing the exact appearance of a past state, a "bouncing-ball" mode, where a cursor points to the area where marking/editing is happening and a "null" mode. In the animated mode, the LiveBoard window replays the LiveBoard timestream (i.e. the timestamped history list), in the sequence recorded. In the "bouncing-ball" mode, the state of the LiveBoard at the end of the session (or end state of a page) is displayed and as events related to objects occur, the objects are highlighted and pointed to by the cursor. In the "bouncing-ball" mode the shape of the cursor changes to indicate the type of event (e.g. a pen for creating the object; a hand for moving the object; an eraser for deleting the object). In the "null" mode the end state of the LiveBoard at the end of a session (or end state of a page) is displayed. The null mode is used when updating of the LiveBoard window is undesirable (e.g. it would be distracting to the user).

In each playback mode, an additional feature called ghosts leaves a faint version of an object (its ghost) on the display even after it is deleted. This feature can be turned on or off by the user. A ghost object can be used as an index into the session.

The animation mode and bouncing-ball mode each indicate the type of event occurring at a particular time. In bouncing ball mode, the cursor tells the type of event, whereas in full animation mode the animation shows the type of event by how it is animated.

Playback control occurs through interaction with the objects displayed during playback. As a simple example, a user may select an object and invoke a play command directly on the LiveBoard to cause immediate playback at the most significant event relating to the phrase (e.g. the time it was written on the LiveBoard). Other playback control features are described below.

The LiveBoard window may be operated as an editor because all the LiveBoard functionality is available. So a user may perform their own manipulation of the objects displayed, or add to the drawings. Such manipulations will generate their own timestream.

It is significant that the LiveBoard window operates as both a player and a playback controller. As opposed to known notetaking systems, the LiveBoard window provides a playback control means which is not strictly based on the end state of the notetaking medium. A user may interact with the LiveBoard at any point during the playback. So for example, a user may be replaying the session and skip ahead to a point in the session (e.g. by a point and click operation on a clock) and notices that a word was erased from the LiveBoard. This could trigger a user to review the portion of the playback related to the erasure of the word in greater detail.

Figure 15:
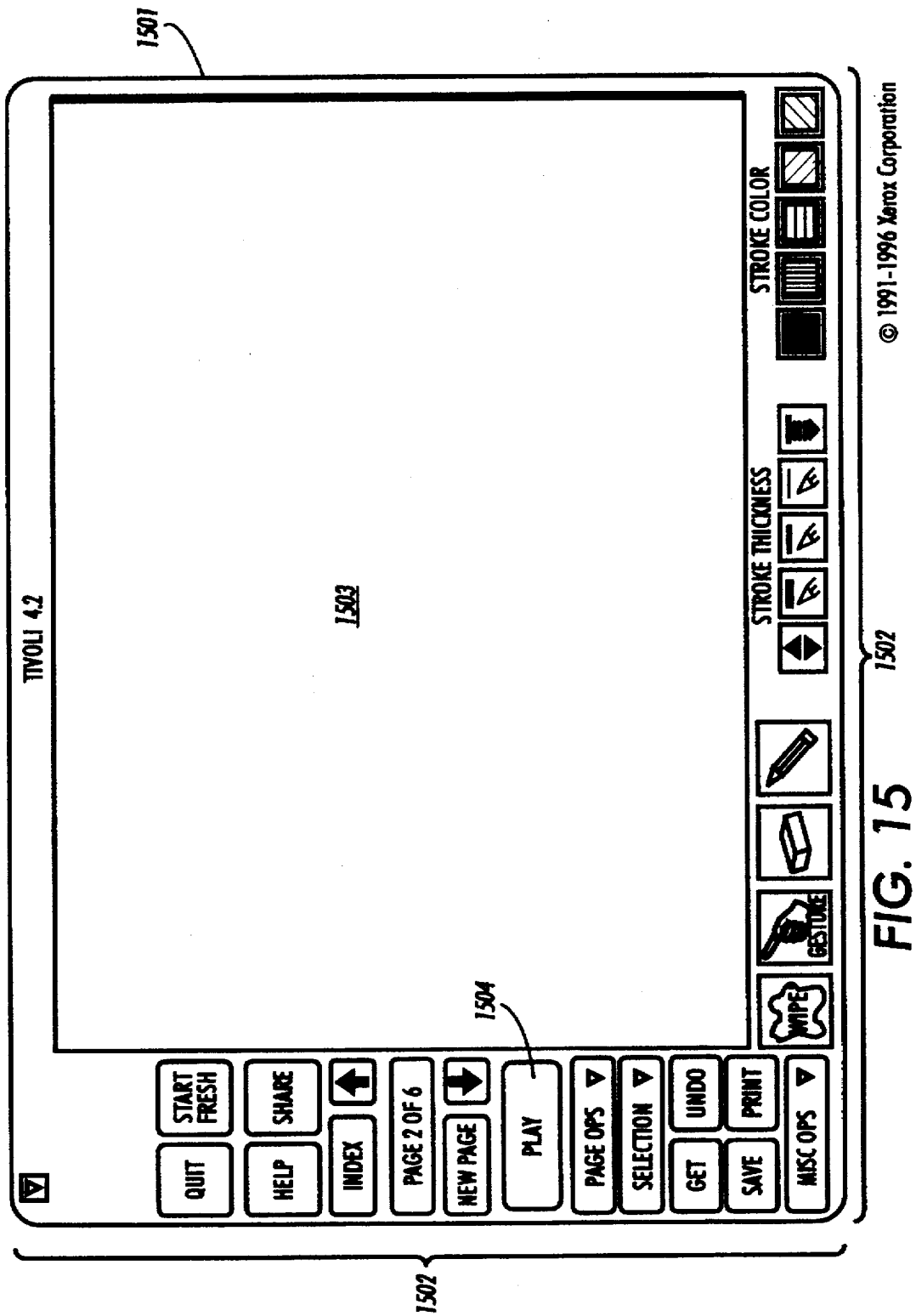
FIG. 15 is an illustration of LiveBoard window in the currently preferred embodiment of the present invention.

FIG. 15 illustrates the LiveBoard Window of the currently preferred embodiment "Copyright 1991-1995 Xerox Corporation" 17 U.S.C. 401). Referring to FIG. 15, the LiveBoard Window 1501 is an instance of the user interface for the Tivoli application running on the session access workstation. The LiveBoard Window is comprised of a controls area 1502 which borders an objects area 1503 on two sides. The various controls in the controls area 1502 are active in the LiveBoard Window 1501. It is the markings displayed in the objects area 1503 which are active and selectable objects. Also illustrated is a Playback Tool 1504. The Playback Tool 1504 is used to initiate playback at a point relevant to a selected object.

The example of an interaction with the LiveBoard to select an object and listen to its earliest point is possible because of the created history list. As described above, the history list is a listing of primitive operations performed and each primitive operation is timestamped and associated with an object. The object is typically defined spatially and as the function performed. For example, draw a line from point X1, Y1 to X2, Y2. So when a selection of an object is made, it is a simple matter of looking at the spatial location, finding the objects at that location, finding the primitive objects associated with the objects and then choosing the time of the most salient event. In the general case, the most salient event will be the "creation" event. However, other times may be interesting to the user so a selection operation is provided which enables as user to select the most salient event (described below).

LiveBoard timestreams can be generally categorized into 2 types: monotonic and non-monotonic. A monotonic timestream has primarily "create" events. The only thing that happens is that new objects are created (no moves, changes or erases). In a monotonic timestream, the overwhelming majority of objects have just one event associated with it (its creation event).

A non-monotonic timestream is comprised of creation, change, move and delete events. Thus, each object can have more than one event associated with it. It is useful to distinguish changes that change the positions of objects (i.e., moves) and those that don't. If a timestream does not have any position-changing events, then each object has a unique position on the display. If there are movement events, then an object may occupy multiple positions during the session. Finally, if a timestream has deletion events, then the objects may disappear at some time during the session.

The LiveBoard window may be used as a playback controller stand-alone or in correlation with the Timeline interface. The correlation with the Timeline interface is described below. In standalone mode, for a monotonic timestream selection of an object and invocation of the playtool will cause replay at the time of the "creation" event for the object (since this is the only event related to the object).

In the case of non-monotonic timestreams, the issue is what "event" to use to commence playback time for a selected object. When the user points to an object with the Playback tool, the system plays the session at the time of the earliest event associated with the object. However, other times for an object might be significant, e.g., the times at which an object was moved might be important. There are alternative ways to access other event times for an object. For example, an event menu may be provided which lists all the events associated with the object. The user just selects the event desired and playback would commence at the time associated with the event.

Another technique is to use a play-next-event button, which skips the playback time to the next event associated with the current object. Yet another technique using timeline correlation is described below.

Clocks

The notion of clocks on a LiveBoard and in the LiveBoard window were described above. A clock is useful in replaying the session in that it provides a temporal reference of when activities took place in the LiveBoard window. Recall that clocks are graphical objects created by a clock gesture. Clocks may be manipulated and edited in the same fashion as all graphical objects. But a clock object is special: it contains a special property, in its data structure that represents its own private "internal" time. When a playback tool touches a clock, the play point is set to the clock's internal time, not to the time of some event associated with the clock (e.g. its creation time). Thus, the clock can be used to deal with time independently of its own history. By default the clock's internal time is the same time as the creation operation for the clock. But it doesn't have to be, and this leads to various useful functions.

The clock's internal time may be altered. In the currently preferred embodiment, when an edit gesture (currently, point and hold) is made on a clock, a menu pops up which allows the user to change the clock's internal time. These change can be either relative (e.g. move the internal time forward or backward by N seconds) or absolute (i.e. change the internal time to a specified time T). The former is most useful, because it allows a clock's internal time to be adjusted slightly to be more accurate for indexing.

For example, in a meeting an interesting issue is raised and discussed. A user at the LiveBoard can index this discussion by creating a clock and writing a note. But usually the clock will be created somewhat after the discussion began. Thus the clock can be edited to adjust its time backwards a bit to more accurately index the start of the discussion. This edit can be made during the meeting or later during an access session. The latter is most useful, because it is convenient to replay the meeting from the current clock setting to determine if the setting is accurate. In the current implementation, this is made convenient for the user by having replay commence automatically after an edit is made, giving the user immediate feedback on the appropriateness of the time setting.

Users can create clocks during an access session by adding them via the LiveBoard window (see the LiveBoard Window as an Editor below). But in this situation the internal time of the clock is set to the current playpoint of the playback tools, not to it's creation time in the access session (which is not at all useful). For example, consider a user accessing an earlier meeting. He listens to the audio of the meeting and hears an important idea that was not indexed during the meeting. So at this point in the playback he creates a clock and then types a note next to it. This clock is a new index into the meeting. Thus the quality and quantity of indexing can be enhanced at access time by being able to create objects that hold times in the original meeting.

LiveBoard and Timeline Correlation

It is often desirable to view all the events associated with an object. For example, a user may wish to know when and if an object was altered or deleted. As described above, all the events associated with an object selected in the LiveBoard are displayed on a selection track of the Timeline interface. This provides a means for displaying user specified relevant indices into a session through correlation between the LiveBoard and Timeline interfaces.

Other features of the correlation through interaction with the LiveBoard Window are illustrated in the following scenario described with reference to FIGS. 16–20. It shotfid be noted that the representation of the LiveBoard Window and the timeline interface have been simplified. In particular, the control areas on the LiveBoard window and the overview time track area of the timeline interface are not shown in the Figures.

Graphical Object to Timeline Indexing

Figure 16:
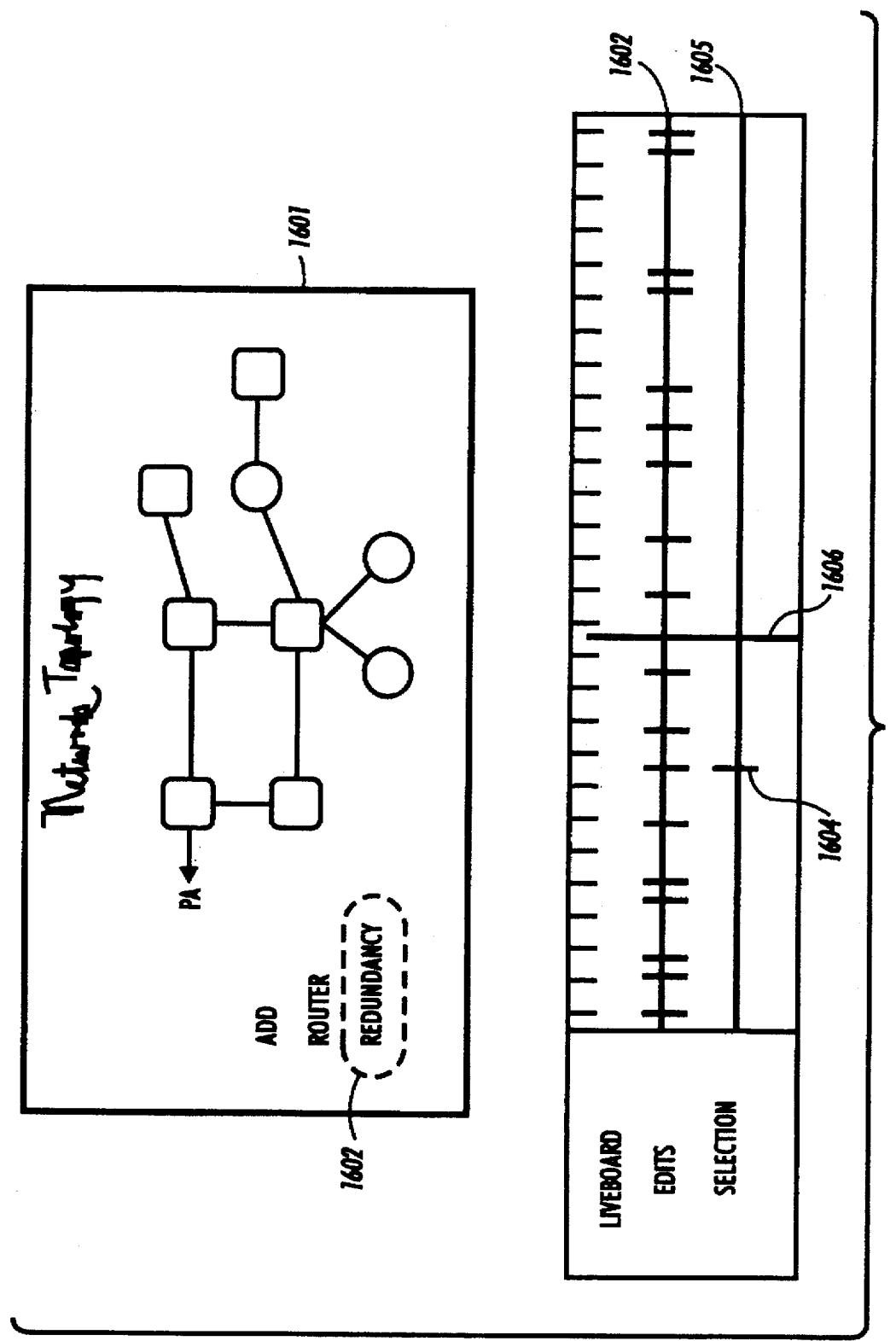
FIG. 16 is an illustration of correlation between the LiveBoard window and the timeline interface, namely graphical object to timeline indexing.

Referring to FIG. 16, the user sees a word in the LiveBoard Window 1601 and wants to replay the conversation when this word was written. The user selects the word 1602 "redundancy" utilizing a suitable selection technique (here by circling the word with a gesture using the pen/mouse). The timeline interface 1603 is then updated on the Select track to show all events related to the selected word. Here, the visual indicator 1604 is displayed on select track 1605. The visual indicator 1604 represents the event of writing the word. In this instance, no other events are associated with the word "redundancy".

Also illustrated in the timeline interface 1603 is playback time indicator 1606. So it is noted that at this time, the playback is at a point "after" the word "redundancy" has been written.

Synchronous Display State

Figure 17:
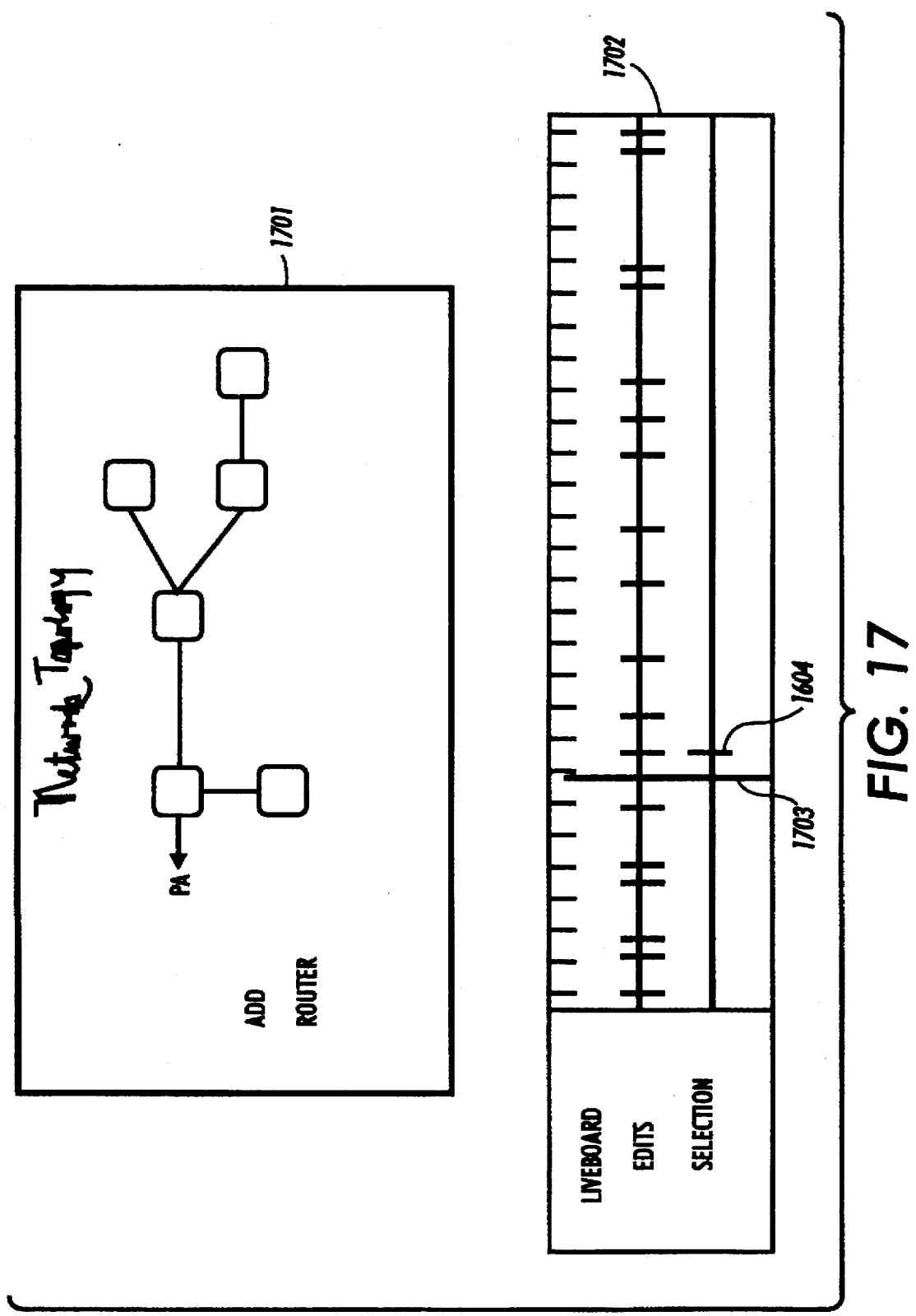
FIG. 17 is an illustration of correlation between the LiveBoard window and the timeline interface, namely a synchronized display state wherein both the LiveBoard window and the timeline interface reflect the same instant in time.

FIG. 17 illustrates the synchronization between the LiveBoard Window and the timeline interface. The user moves playback time indicator 1703 in the timeline interface 1702 just before the visual indicator 1604. The LiveBoard window 1701 is then updated to display what was on the LiveBoard at that instant in time. In particular it is noted that when compared to FIG. 16, the word "redundancy" does not appear in the LiveBoard window.

When the Play command is invoked, both the LiveBoard window and timeline interface are updated synchronously. After a while the word "redundancy" will appear on the LiveBoard.

Temporal to Spatial Indexing

Now the user notices that there were some events on the timeline just before the event on the selection track. he user selects the visual indicators representing these events on the timeline, and immediately the corresponding elements of the drawing are highlighted in the LiveBoard window. That is, the correlation between the drawing and the timeline is bi-directional.

Figure 18:
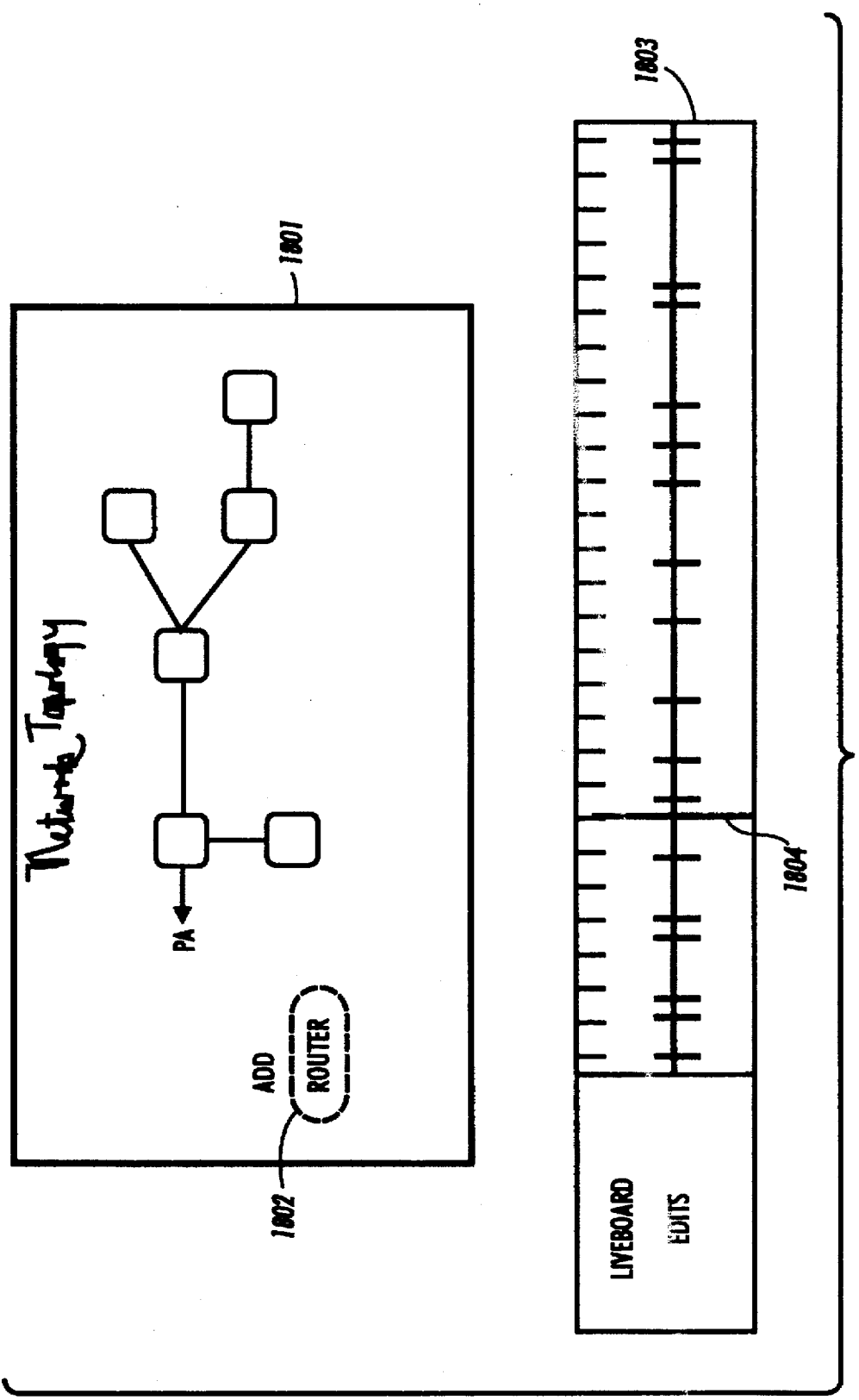
FIG. 18 is an illustration of correlation between the LiveBoard window and the timeline interface, namely temporal to spatial indexing.

This is illustrated in FIG. 18. The visual indicator 1804 are selected from the timeline interface 1803. In the LiveBoard window 1801, the word "router" 1802 is highlighted (illustrated here by the dashed circle.) Thus the event corresponding to the visual indicator 1804 is associated with the word "router".

Multiple Events Per Graphical Object

Next, the user sees a bold box on the diagram in the LiveBoard window and selects the box. Three visual indicators are displayed on the selection track of the timeline interface (alternatively, the three visual indicators could have been highlighted on the Edit track). The first type of visual indicators designate the creation events for the box, the second type of visual indicators designate the line-width-changing events when the box was made bold; and the third type of visual indicators designate the event of moving the box on the drawing. As noted above, the visual indicators on the timeline interface are visually distinct to indicate the kind of events they represent. The user is interested in why the box is bold and so moves the time marker to the line-width-changing events and invokes playback using the playtool.

Figure 19:
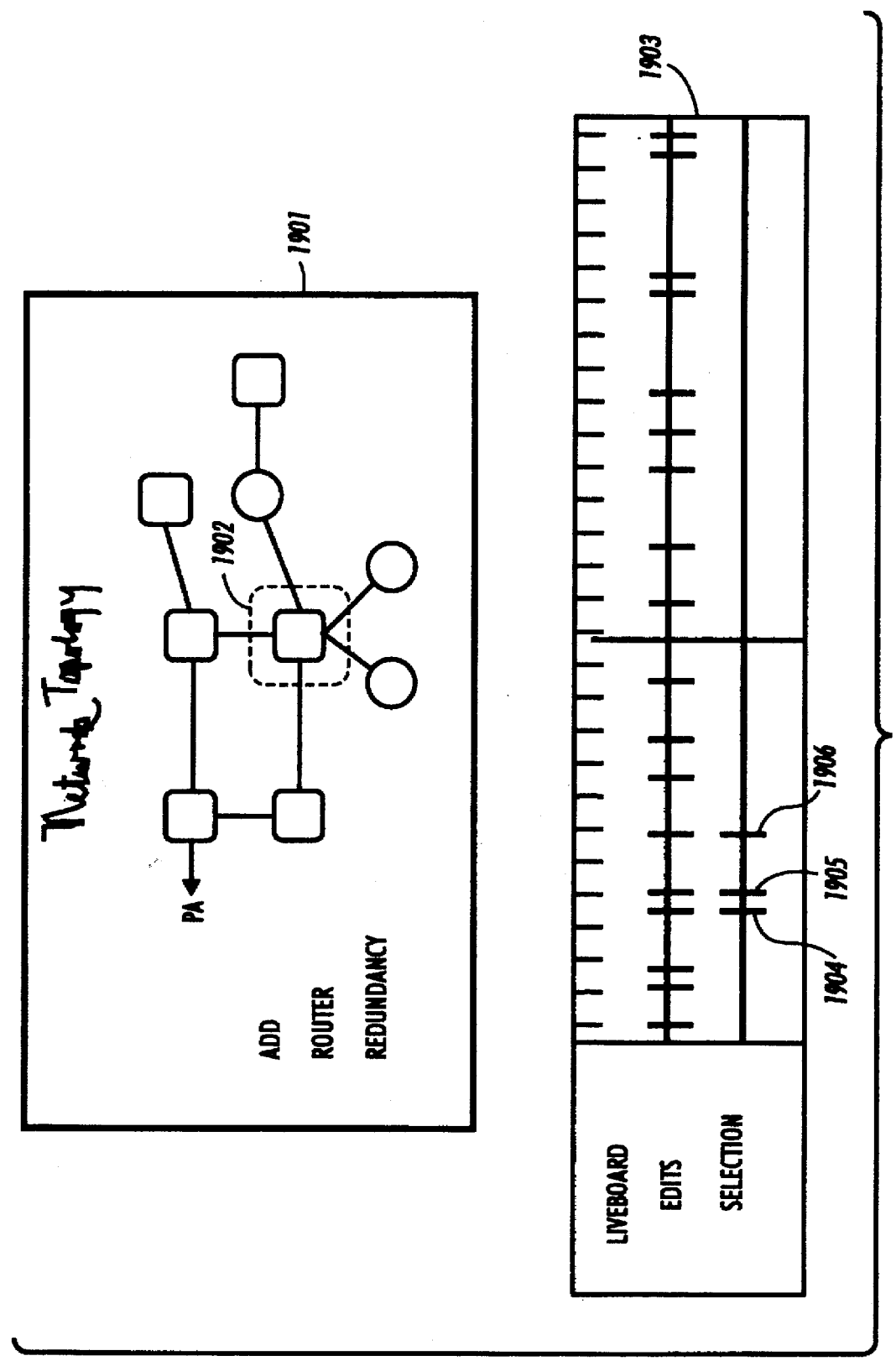
FIG. 19 is an illustration of correlation between the LiveBoard window and the timeline interface, namely multiple events per graphical object.

This is illustrated in FIG. 19. The box 1902 is highlighted in LiveBoard window 1901. The visual indicators 1904–1906 are highlighted in the timeline interface 1903. As described above, each of these visual indicators represents a particular type of event associated with the object. Further, in the currently preferred embodiment, each visual indicator will have some visual characteristic, typically color, which will correspond to the type of event.

The user selects visual indicator 1904 from which to commence replay.

Indexing by Location in the Objects Area

Next, the user considers a diagram on another page of the drawing. This diagram was drawn, erased, and redrawn several times throughout the meeting; and the user wants to hear why the earlier versions were not considered to be correct. The user selects the area of the drawing where the diagram is located. Now, several sections of the timeline are highlighted, revealing all the events for all the objects that were ever in that area of the drawing, including objects that have been deleted or moved. The user moves the time marker to the first highlighted deletion visual indicator to find the discussion of why the first version was changed.

A visual cue that objects will be or were in a particular location is ghost objects. Ghost object are faint outlines of objects used to indicate that at some point in time during the session, an object was at this particular location. A user may notice various object ghosts and want to know what was or will be there (e.g. a list of items where at the end of a session it is apparent by the ghost object that an item was erased).

Figure 20:
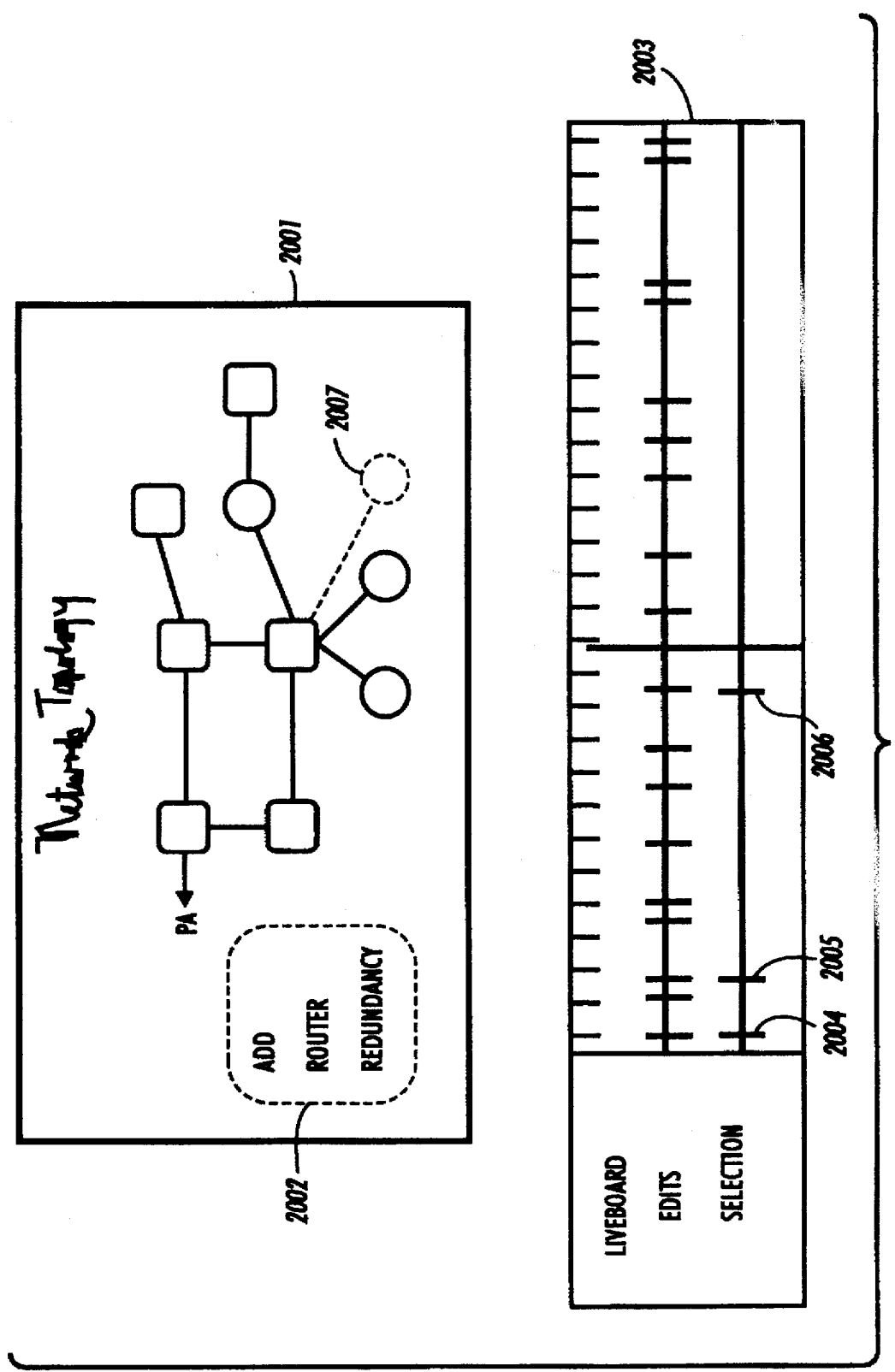
FIG. 20 is an illustration of correlation between the LiveBoard window and the timeline interface, namely indexing by location in the objects area.

This is illustrated in FIG. 20. Referring to FIG. 20, the user has selected area 2002 in the diagram of the LiveBoard window 2001. Briefly referring to FIG. 16, the area 2001 corresponds to the area containing the list of words, "add", "router" and "redundancy". The timeline interface 2003 has now highlighted multiple visual indicators 2004–2006 which relate to events that correspond to events associated with the area 2002, namely events associated with the words "add", "router" and "redundancy". It should be noted that this is merely a spatial correlation, namely, an event representing a word that was erased on the list may also have been highlighted. Further illustrated in FIG. 20 is "ghost" object 2007. At this point in the playback, the object at the location indicated by "ghost" object 2007 has been erased.

LiveBoard Window As an Editor

As described above, an editor permits a user to add timestream and event data after the fact. When the LiveBoard Window is used as an editor, what is edited is the markings on the LiveBoard (or new markings added). In this case, additions and or deletions to the LiveBoard timestream are made as a result of such editing. Alternatively, a separate timestream may be created.

Figure 21:
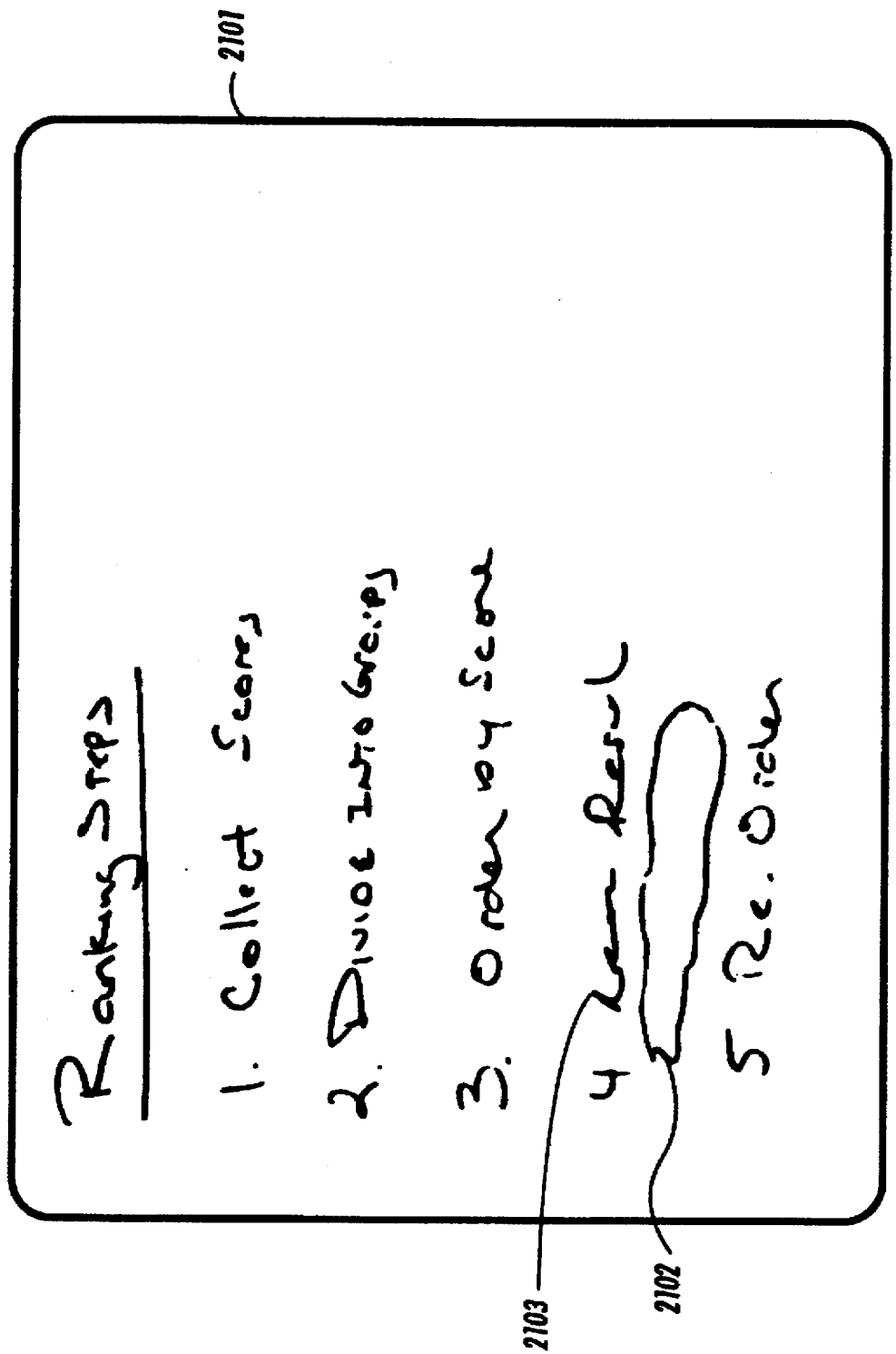
FIGS. 21 and 22 provide an example of LiveBoard window operating in the "bouncing-ball" playback mode before and after the LiveBoard window has been edited.
Figure 22:
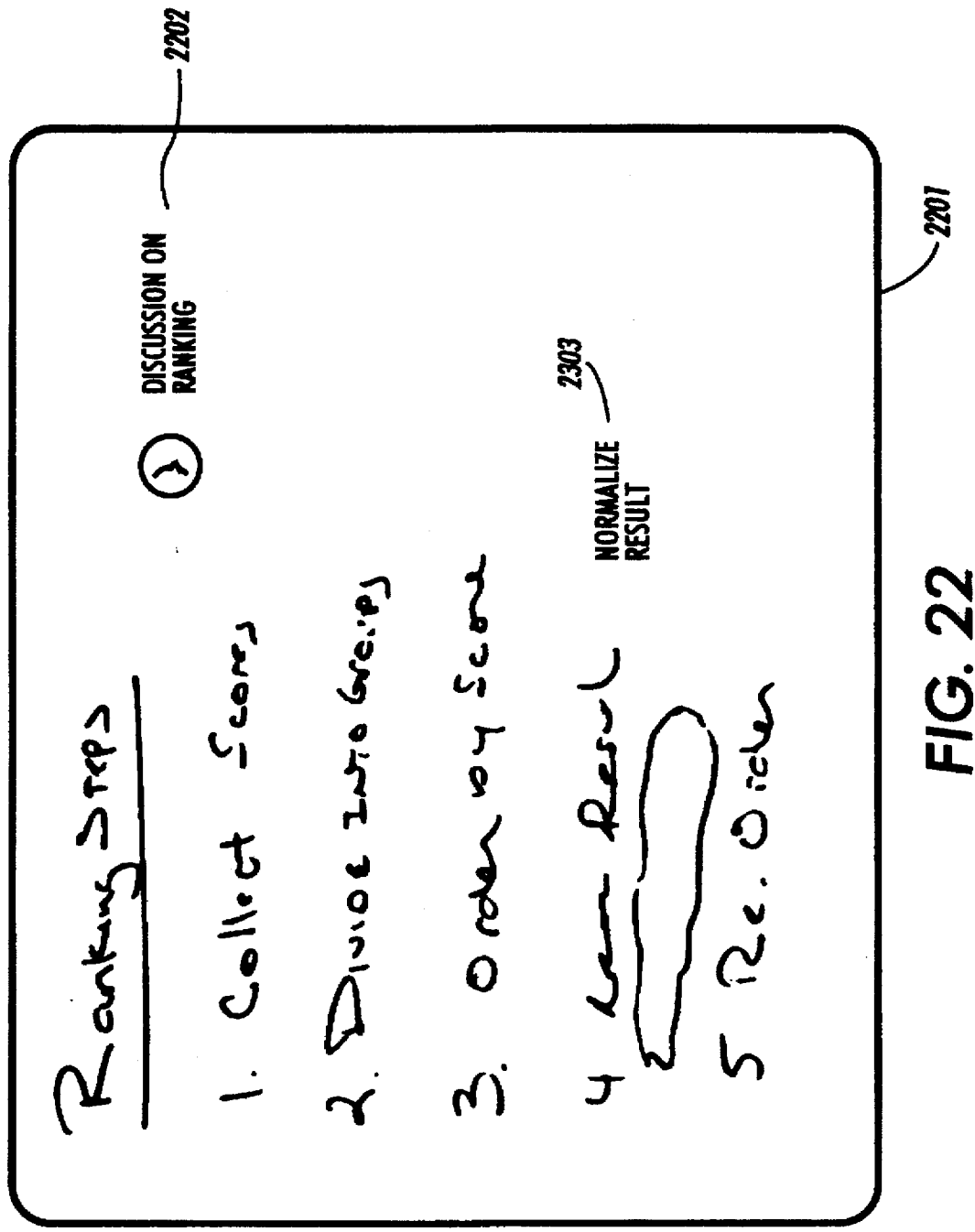

The LiveBoard Window when used as an editor provides a very effective vehicle for enabling a non-participant to efficiently review the recorded session. This is in part because all the basic capabilities of the LiveBoard are available during the replay of the session. This is best described with reference to FIGS. 21 and 22 showing the LiveBoard Window at the end of a session both before and after an editing session. The LiveBoard in this example is operating in the bouncing ball playback mode.

Referring to FIG. 21, various handwritten markings appear on the LiveBoard window 2101. As discussed above, each of these handwritten markings may be used to index into the session. However, during some meetings some of the markings may be extraneous (e.g. mark 2102), or even illegible (e.g. mark 2103). Moreover, there may even have been important points that were discussed, but somehow never made it on to the LiveBoard.

FIG. 22 illustrates the LiveBoard window of FIG. 21 after someone has edited it. Referring to FIG. 22, the edited LiveBoard window 2201 has been expanded to accommodate notations made by the editor. The edited LiveBoard window 2201 makes use of clocks and inserted text to provide more indices and information. In FIG. 22, text has been associated with each clock to indicate what is being discussed at that point. So for example, the text 2203 can be used to indicate what the mark 2103 means. The clock/text 2202 indicates what the collection of markings represent and when creation of the markings began. Clearly, the edited LiveBoard window would enable a subsequent viewer to more effectively use the LiveBoard window as a playback controller.

As an editor, the existing markings on the LiveBoard window may be changed. This may done for example to erase the extraneous marking, e.g. the marking 2102 of FIG. 21 so as to not detract the subsequent viewer of the window.

User Control Of Captured Timestreams

Another aspect of the timestream architecture is control of captured timestreams. Users are very concerned about captured timestreams, especially timestreams which are "literal" records like audio and video. They are concerned with who has access to the literal records of their activities and conversations. They are concerned with knowing when they are being recorded, and they want control over this. On the other hand, after an interesting but unrecorded discussion, users often wish that they had recorded it.

User control is supported in the timestream architecture. However, implementation requires user interface tools to effectively give control to the user, both during the capture of sessions as well as afterwards.

The timestream architecture provides for special treatment of "Control Events". A Control Event specifies a time span (start time and duration), which timestreams to control, what kind of control (purge level of protection), and when the control takes effect.

Given that captured sessions can have multiple timestreams, a Control Event can selectively control them. For example, it may be useful to control just the audio during a sensitive span of a discussion. A Control Event can also specify all timestreams in the session.

There are several kinds of control. The recorded material can be physically purged from the database. Access to hearing or viewing the recorded material can be denied or given to specific users or groups of users. Access can be of different types, such as access to be able to read only, to be able to append new material to be able to fully edit the material, or to be able to change the access controls. For example, Control Events may specify that only the chair of a meeting may edit the meeting records, that only the manager of the group may change the access controls, that only the meeting's attendees may append new material to the captured records, and that only a specific set of other individuals may listen to the captured audio.

Finally, the timing of the controls can be specified. This is most useful for purging. Captured records can be purged at different times, such as immediately upon specification (e.g., to eradicate a personnel discussion), right after a session (e.g., to erase an uninteresting meeting), or days or months later (e.g., for archiving and storage management). But it may also be specified that access to a meeting's records be denied to non-attendees for a week, giving the chair time to edit the records.

While the Timestream architecture makes it possible for Control Events to specify a variety, of controls, the architecttire does not implement them directly, but delegates control to the various components of the architecttire. Many of the specifications can be encoded in the database to enforce them. The timestream Players and the Timeline interface can also help enforce some access controls. The purging usually must be implemented by Recorders, or by some process that understands a particular timestream's data format. A purging process can either overwrite the data to be purged ("zero it out") or actually rewrite and compress the records by leaving out the data to be purged. The Timestream architecture does not per se guarantee a full implementation of the Control Events, but only to do the best it can with components available in a given situation.

It has been determined that providing access controls in a time-based way is very subtle in general. For example, suppose that the audio/video record of a certain 10-minute span of discussion is to be purged because it deals with a sensitive decision; and suppose that the video record showed a whiteboard on the wall. Even if the 10-minute span is purged from the video, there is no guarantee that remnants from that discussion do not remain on the whiteboard after that span. As a practical matter, however, time-based controls are useful most of the time.

Control Events are only useful if users can easily create and edit them. It is natural for users to specify Control Events with the Timeline Interface after a session.

In the currently preferred embodiment, a simple set of user interface tools are provided to give the users unobtrusive control of audio recording during the session. It is important to make users aware of when recording is taking place. The red light on a video camera does this. For the LiveBoard, a flashing "On Record" is displayed while recording is taking place. Pause and Record buttons, both hard buttons on physical devices and soft buttons on either the LiveBoard or computer display, allow the users to turn the recorders on and off. But this control must be anticipated: the user must know ahead of time that the coming activity, is either interesting or sensitive and therefore to either Record or Pause the recorders. In practice, this is not effective: users often do not recognize these situations until well after they are started. Thus, post-hoc control is needed.

Our user interface provides for this by implementing a concept of "On Record" and "Off Record" (in addition to Pause and Record), which allows users to control recording after the fact, but within a session in an appropriate manner. The idea is that a whole session is actually recorded, users are allowed to mark parts of the session as being On Record or Off Record, and after the session the Off Record parts of recordings are purged.

When a session is started for recording, a flashing "On Record" notice is displayed, along with an Off Record button. When the Off Record button is pressed, the user can mark the session to be off the record as of now or as of N minutes ago. For example, if a discussion starts shifting to a sensitive topic and the discussants note this after a few minutes, they can then set the last, say, 5 minutes to be Off Record. Similarly, when the session is off the record, a flashing "Off Record" is displayed along with an On Record button, which allows the user to mark the session as on the record. For example, when the discussion gets interesting, the last 10 minutes can be put back on the record. These controls persist to the end of the session, when the users could decide that the whole session is to be put on or off the record.

What these user interface tools do is to cause Control Events to be created during the session (off record segments are marked as purged and on record segments marked as allowing access). After the session is closed, a process is run that analyzes the produced Control Events for conflicting specifications (i.e., spans of the session are marked as both on and off the record) and then calls the Recorders to purge the records. One technique for conflict resolution is to give precedence to more recent Control Events. However, a user can ask to see the Control Events via the Timeline interface and edit them before calling for a purge.

One difficulty in this user interface is that it is difficult for a user to know how many minutes back in time to change the record. One improvement for this would be to use our audio analysis tools to given the user more meaningful time points. For example, after pressing the Off Record button, a menu of backup points to recent audio pauses or speaker changes could be presented. The user could be allowed to playback from these to determine the correct time point.

Thus, a computer controlled display system for accessing contemporaneously timestreams of information is disclosed. While the present invention is described with respect to a preferred embodiment, it would be apparent to one skilled in the art to practice the present invention with other configurations of information retrieval systems. Such alternate embodiments would not cause departure from the spirit and scope of the present invention.

We claim:

1. A system for the capture and replay of sessions comprising:
   one or more recorders for capturing timestreams for a session, each of said one or more recorders capturing a timestream for a particular media;
   an event analyzing means coupled to receive a timestream, said event analyzing means for identifying and generating instances of events contained within said timestream, said events representing natural activities that occur during the course of said session;
   a session storage means coupled to said one or more recorders and said event analyzing means, said session storage means for storing timestreams and a timestreams corresponding events;
   a session access device coupled to said session storage means for receiving said timestreams and corresponding events, said session access device for controlling playback of said timestreams, said session access device comprising:
   a display;
   a processor for generating display information for showing a user interface on said display, said user interface comprising a plurality of windows, wherein at least one of said windows is for providing playback control through selection of one or more of a plurality of visual indicators, each of said plurality of visual indicators representing an event, and at least one of said windows is for playing back a timestream; and
   a cursor control device for enabling user interaction with said user interface via a cursor on said display.

2. The system as recited in claim 1 wherein at least one of said windows of said user interface operates as an editor for creating new timestream information and events.

3. The system as recited in claim 1 wherein at least one of said windows of said user interface operates both as a playback controller and a player.

4. The system as recited in claim 1 wherein said event analyzing means is comprised of a plurality of means each for analyzing a timestream for a particular media.

5. The system as recited in claim 4 wherein one of said one or more recorders is an audio recorder for recording an audio timestream and said event analyzing means is further comprised of means for segmenting an audio timestream by speaker so that each instance of a speaker is an event.

6. The system as recited in claim 4 wherein one of said one or more recorders captures primitive operations performed a shared representation media and said event analyzing means is further comprised of means for identifying predetermined sequences of primitive operations in a shared representation media timestream, said predetermined sequences of primitive operations indicating an event.

7. The system as recited in claim 1 further comprising one or more event recorders for capturing events indicated by a user during said session.

8. The system as recited in claim 7 wherein one of said one or more event recorders is a button for creating button events, said button controlled by a participant of said session, said button events representing a point in time in said session deemed noteworthy by said participant.

9. The system as recited in claim 1 further comprising one or more players coupled to session access device, each of said one or more players for playing back timestreams for a particular communication domain of the session.

10. The system as recited in claim 1 further comprising a clock generation means, said clock generation means for generating an event representing a point in time during said session.

11. The system as recited in claim 1 further comprising a control means, said control means for generating control events, said control events specifying a control type, a being time and a duration, said control event for controlling access to an associated portion of said captured session.

12. A method for recording and replaying a session comprising the steps of:
   a) capturing one or more timestreams using one or more capture devices, each of said one or more capture devices capturing a specific media;
   b) storing said one or more timestreams in a session storage device;
   c) analyzing one or more timestreams to create events for each of said one or more timestreams, each event capable of being an index point for the playback of said timestreams;
   d) storing each of said events in said session storage device;
   e) a session access workstation receiving a request to replay a session;
   f) said session access workstation creating from said events a plurality of visual indicators for use in a user interface, said user interface for moving playback of said timestreams to specific points in time of said session;
   g) displaying said user interface on a display coupled to said session access workstation;
   h) said session access workstation detecting that a user has selected a visual indicator from said user interface;
   i) said session access workstation causing the movement of a playback point to a time associated with said visual indicator; and j) players coupled to said session access workstation playing back said timestreams at an index point associated with said selected visual indicator.

13. The method as recited in claim 12 wherein one of said one or more timestreams is an audio timestream comprised of a recording of the audio of said session, and said step of retrieving and analyzing one or more timestreams to create an event list for said one or more timestreams is comprised of the steps of:

retrieving said audio timestream; and repeating the following substeps for the entirety of said audio timestream:
identifying a span of time when a person is speaking;
associating said span of time with said person; and
generating an audio event specifying said a begin time, duration, and said person.

14. The method as recited in claim 13 wherein said step of creating from said event lists a plurality of visual indicators for use in a user interface is further comprised of the steps of:

generating a visual indicator for each audio event; and displaying said visual indicators for each audio event in a temporal sequence.

15. The method as recited in claim 12 wherein one of said one or more timestreams is a shared representation media timestream comprised of timestamped primitive shared representation media operations, and said step of retrieving and analyzing one or more timestreams to create an event list for said one or more timestreams is comprised of the steps of:

retrieving said shared representation media timestream; and repeating the following substeps for the entirety of said shared representation media timestream:
identifying a set of primitive operations comprising a shared representation media event type;
generating an instance of said shared representation media event type as an event; and
associating said instance of a shared representation media event type with an object created on said electronic whiteboard.

16. The method as recited in claim 15 further comprising the steps of:

replaying said shared representation media timestream in a window of said user interface;

detecting that a user has selected an object in said window replaying said shared representation media timestream;

identifying an event associated with said object to be used for specifying a point in time in the session to move playback to; and moving playback to said time.

17. A system for capturing and processing a timestream of a collaborative activity so that playback of said collaborative activity can be controlled by an index of activities naturally occurring during said collaborative activity, said system comprising:

one or more recorders for capturing timestreams of said collaborative activity, each of said one or more recorders capturing a timestream for a particular media, each of said timestreams providing information for replaying a particular media;

an event analyzing means coupled to receive a timestream, said event analyzing means for identifying and creating events contained within said timestream, said events representing natural activities that occur during the course of a session;

means for generating a visual indicator for each of said events, each of said visual indicators for display on a user interface wherein playback of said collaborative activity can be invoked by selection of one of said visual indicators on said user interface;

a session storage means coupled to said one or more recorders and said event analyzing means, said session storage means for storing timestreams and events; and a start-up means coupled to said one or more recorders and said session storage means, said start-up means for coordinating the start-up of the recording of said collaborative activity.

18. The system as recited in claim 17 wherein one of said recorders is an audio recorder and said event analyzing means is further comprised of means for analyzing an audio timestream for creating events representing spans of time when a particular person is speaking.

19. The system as recited in claim 17 wherein one of said recorders is a shared representation media and said event analyzing means is further comprised of means for analyzing a shared representation media timestream for creating instances of events relating to creation, editing, movement or deletion of objects drawn on said shared representation media.

* * * * *